United States Patent
Kobayashi et al.

(10) Patent No.: US 7,253,935 B2
(45) Date of Patent: Aug. 7, 2007

(54) OPTICAL SCANNER, IMAGE FORMING APPARATUS, AND OPTICAL SCANNER ATTITUDE CORRECTING METHOD

(75) Inventors: Kazuhiko Kobayashi, Tokyo (JP); Nobumitsu Samukawa, Tokyo (JP); Yohei Miura, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 6 days.

(21) Appl. No.: 11/333,433

(22) Filed: Jan. 18, 2006

(65) Prior Publication Data
US 2006/0164504 A1    Jul. 27, 2006

(30) Foreign Application Priority Data
Jan. 21, 2005   (JP)   ............... 2005-014820

(51) Int. Cl.
G02B 26/08   (2006.01)
(52) U.S. Cl. ............ 359/196; 359/204; 359/900; 347/259; 347/243; 347/244
(58) Field of Classification Search ........ 359/205–208, 359/820, 196
See application file for complete search history.

(56) References Cited
U.S. PATENT DOCUMENTS 5,412,510 A * 5/1995 Iizuka et al. ............ 359/820
5,864,739 A * 1/1999 Kaneko et al. ............ 399/220

FOREIGN PATENT DOCUMENTS

| JP | 1-130172 | 5/1989 |
|---|---|---|
| JP | 9-193463 | 7/1997 |
| JP | 2858735 | 12/1998 |
| JP | 11-109268 | 4/1999 |
| JP | 11-326804 | 11/1999 |
| JP | 2000-330046 | 11/2000 |
| JP | 2001-142012 | 5/2001 |
| JP | 2004-77569 | 3/2004 |
| JP | 2004-109761 | 4/2004 |
| JP | 2004-258182 | 9/2004 |

* cited by examiner

Primary Examiner—Stephone B. Allen
Assistant Examiner—Jennifer Doak
(74) Attorney, Agent, or Firm—Oblon, Spivak, McClelland, Maier & Neustadt, P.C.

(57) ABSTRACT

An optical scanner includes a light source that emits a light beam, a deflection unit that deflects the light beam, an optical unit that introduces the light beam to a target surface, a housing unit that stores these components, and a member that contacts the light source and/or the optical unit. The light source and/or the optical unit changes in attitude due to a temperature change while the optical scanner is operating. The member extends or contracts according to the temperature change so as to reduce the change of the attitude.

30 Claims, 20 Drawing Sheets

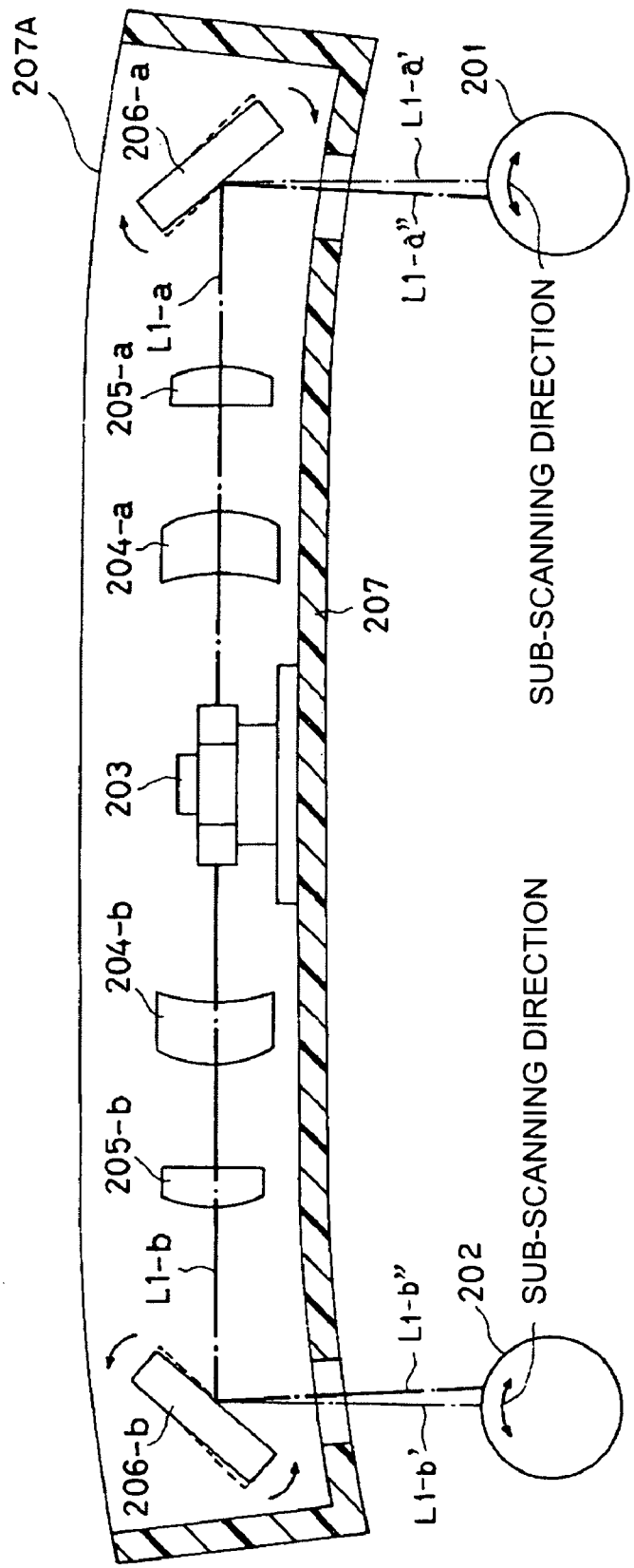

OPTICAL SCANNER, IMAGE FORMING APPARATUS, AND OPTICAL SCANNER ATTITUDE CORRECTING METHOD

CROSS-REFERENCE TO RELATED APPLICATIONS

The present document incorporates by reference the entire contents of Japanese priority document, 2005-014820 filed in Japan on Jan. 21, 2005.

BACKGROUND OF THE INVENTION

1. Field of the Invention

The present invention relates to a technology for correcting an attitude of an optical element in an optical scanner.

2. Description of the Related Art

Tandem-type electrophotographic image forming apparatuses (e.g., a copying machine, a printer, a facsimile machine, a plotter, or a multifunction product) include a plurality of image carriers (e.g., photosensitive drums) for different colors. Laser beams are irradiated on surfaces of the respective image carriers to form latent images. In one example, line scanning is performed by laser beams emitted from a plurality of laser units to scan latent images formed on four aligned photosensitive drums, thereby developing the latent images on the photosensitive bodies with development agents of different colors (e.g., toners of yellow, magenta, cyan, and black) and visualizing them, respectively. Thereafter, a transfer material, e.g., a recording sheet, is sequentially conveyed by belts to transport units for the respective image carriers, visual images of the respective colors formed on the image carriers are registered and transferred onto the transfer material, and images transferred onto the transfer material are fixed, thereby obtaining a multicolor image.

Such a tandem image forming apparatus is generally provided with a plurality of optical scanners, which operate independently, corresponding to the respective photosensitive drums, to perform latent image scanning on the photosensitive drums. However, the conventional tandem image forming apparatus has the following disadvantages. An optical scanner using an optical deflector constituted by a polygon mirror and a motor that drives the polygon mirror is relatively expensive. If the optical scanners are provided independently to correspond to the respective photosensitive drums, component costs and manufacturing costs increase. In addition, large space is required to install a plurality of optical scanners each including the optical deflector to correspond to the respective photosensitive drums. As a result, the overall image forming apparatus becomes large. To solve these disadvantages, i.e., to reduce the cost and size, an image forming apparatus configured as follows has been realized. As means for performing an optical scanning on a plurality of photosensitive drums, an optical deflector common to a plurality of laser units is employed. In other words, a single optical deflector simultaneously deflects and scans laser beams from the respective laser units, and irradiates the laser beams on a plurality of photosensitive drums, thereby performing the optical scanning on the respective photosensitive drums.

This conventional image forming apparatus includes optical systems configured as follows. The optical systems, which are arranged symmetrically around the optical deflector in two directions, introduce the laser beams emitted from the laser units and deflected and scanned by the optical deflector onto corresponding scanning target surfaces, and form images, respectively. All components of the optical scanner including these optical systems are stored in a single housing. Therefore, as compared with the conventional apparatus that includes a plurality of optical scanners, the number of components and installation space can be reduced. It is thereby possible to reduce the cost and size of the image forming apparatus.

Meanwhile, such an image forming apparatus normally includes a laser unit for black and three laser units for other colors (e.g., cyan, magenta, and yellow). In a monochrome mode for forming a monochrome image, the image forming apparatus only uses the laser unit for black. In a color mode, the apparatus uses all of the laser units. The apparatus simultaneously deflects the laser beams from these four laser units using a single optical deflector, irradiates the laser beams onto the four photosensitive drums through their corresponding optical systems, and performs the optical scanning on each of the photosensitive drums. To irradiate the laser beams onto the four photosensitive drums and form latent images, the apparatus includes a synchronous sensor that synchronizes write positions in main scanning directions of the laser beams from the four laser units. Using output from this synchronous sensor, timings of scanning the four respective colors are synchronized with one another.

The laser beams are thus transmitted onto scanning target surfaces of the respective photosensitive drums and imaged by the transmission and imaging optical systems provided for each of the laser units. Therefore, scanning lines on the scanning target surfaces formed by the respective laser beams are influenced by characteristics and geometrical arrangements of optical components that constitute the corresponding optical systems, and are therefore different in scanning characteristics. When imaging positions of the laser beams in a sub-scanning direction largely differ, a deviation is caused among the respective colors of a final image, and thereby causes image degradation. Conventionally, the image degradation resulting from color registration deviation is prevented by, for example, detecting the deviations among the respective colors and adjusting write start timings in the sub-scanning direction of the respective laser beams.

However, even if the scanning characteristics that cause the image degradation resulting from the color registration deviation or the like are initially adjusted so as not to cause the color registration deviation, positions of images drawn on the respective photosensitive drums are gradually deviated by a change in attachment positions of the components and a change in shapes of the components themselves due to heat generated by the apparatus or the like, that is, by a change in attitudes of the components. As a result, the image position deviation (hereinafter, displacement) or, in case of the full-color image forming apparatus, the color registration deviation occurs. Furthermore, the scanning lines formed by the respective lasers are influenced by the characteristics and geometric arrangements of the optical components that constitute the corresponding optical systems. Accordingly, the change in the attachment positions of the components caused by heat generation of each scanning line, and the change in the shapes of the components themselves differ among the scanning lines.

With reference to FIGS. 7 and 9, one example of the image displacement due to the change in the attachment positions of the optical components, i.e., the change in the attitudes of the optical components that occurs to the conventional optical scanner is explained.

In FIGS. 7 and 8, reference numeral 203 denotes a single optical deflector arranged in the optical scanner. Reference symbols 204-*a* and 204-*b* denote fθ lenses also referred to as first imaging lenses, and reference symbols 205-*a* and 205-*b* denote elongated toroidal lenses. In addition, reference numeral 207 denotes an optical housing that stores optical components such as the optical deflector 203, the fθ lenses 204-*a* and 204-*b*, and the toroidal lenses 205-*a* and 205-*b*, and reference symbol 207A denotes a cover that covers up the optical housing 207.

As shown in FIGS. 7 and 8, the optical deflector 203 is a rotating polygon mirror that includes a plurality of planes of deflection. The optical deflector 203 is driven to rotate at a constant velocity by a polygon motor (not shown). Heat is generated from the polygon motor with passage of an operating time of the optical deflector 203, that is, an increase in the number of rotations of the optical deflector 203. The heat generated from the polygon motor is transmitted not only through the optical deflector 203 directly to the optical housing 207 but also through an air current generated by the optical deflector to the optical housing 207. Accordingly, a temperature distribution is generated in the optical housing 207 according to a distance from the optical deflector 203 and a degree of heat transmission.

The temperature generated in the optical housing 207 deforms the optical housing 207 from a state shown in FIG. 7 in which the optical scanner is not used yet to a state shown in FIG. 8. At this time, attitudes of folding mirrors 206-*a* and 206-*b* serving as optical components arranged on both ends of the optical housing 207, respectively are changed. Accordingly, exposure positions of beams L2-*a* and L2-*b* reflected by the folding mirrors 206-*a* and 206-*b* on respective photosensitive drums 201 and 202 are changed.

This state is explained with reference to FIGS. 9A and 9B. In FIGS. 9A and 9B, the folding mirror 206-*a* (hereinafter, simply mirror 206-*a*) arranged on the right side out of the mirrors 206-*a* and 206-*b* shown in FIGS. 7 and 8 is typically explained below.

FIG. 9A depicts a state in which optical components within the optical scanner are located at normal positions corresponding to FIG. 7. In FIG. 9A, the laser beam L1 emitted from a laser unit (not shown) is struck against a reflecting surface 206*a* of the mirror 206-*a*, reflected by the reflecting surface 206*a* at an angle θ, and exposed on a surface of the photosensitive drum 201. Upper and lower ends of the reflecting surface 206*a* of the mirror 206-*a* are supported by reception surfaces 208-*a* and 208-*b* formed integrally with the optical housing 207, respectively. Plate springs 220 serving as urging means or urging members are provided to correspond to both ends of the mirror 206-*a* formed to extend from a front to a depth side in FIG. 9A, respectively. In a back view, a generally central portion of the mirror 206-*a* is urged by tip ends of the plate springs 220 in a direction in which the reflecting surface 206*a* of the mirror 206-*a* contacts with and is pressed against the reception surfaces 208-*a* and 208-*b*. By doing so, the mirror 206-*a* is held by the reception surfaces 208-*a* and 208-*b* so as not to change the attitude and arrangement position of the mirror 206-*a* by an ordinary vibration or external force transmitted through the optical housing 207 from an outside of the optical housing 207.

For brevity of illustration of the conventional technique as well as embodiments of the present invention to be explained later, hatching of the mirror 206-*a* and the plate springs 220 are not shown in all drawings except for FIG. 9A.

FIG. 9B depicts a state after some time has passed from when the conventional optical scanner started operating. This corresponds to the state when the optical housing 207 is thermally deformed as shown in FIG. 8 and the attitude of the mirror 206-*a* is changed (the mirror 206-*a* rotates in an arrow direction in FIG. 9B). The attitude of the mirror 206-*a* is thus changed or rotationally displaced from the state indicated by a solid line in FIG. 9A by as much as α as indicated by a solid line in FIG. 9B. The laser beam L1-*a* from the laser unit is thereby changed to a laser beam L1-*a"* folded at a reflection angle that is changed from θ to θ-2α, the laser beam L1-*a"* is irradiated and exposed on the photosensitive drum 201. Therefore, the exposure position of the laser beam in, the sub-scanning direction on the photosensitive drum 201 is deviated. Thus, the change in the attitudes of the optical components such as the folding mirrors deviate the intended exposure position.

As shown in FIG. 8, the mirror 206-*b* arranged on an opposite side to the mirror 206-*a* across the optical deflector 203 mainly differs from the mirror 206-*a* only by a rotational displacement in an opposite direction to that of the mirror 206-*a*. Similarly to the mirror 206-*a*, the exposure position of the laser beam in the sub-scanning direction on the photosensitive drum 202 is deviated as will be readily understood by a person having ordinary skill in the art. Therefore, the deviation of the exposure position for the mirror 206-*b* will not be further explained herein. Needless to say, the optical housing 207 is not always deformed ideally, i.e., horizontally uniformly in amount as shown in FIG. 8 because of differences in the shape of the optical housing, the arrangement of the optical components, and the like, as is explained later.

An image forming apparatus that employs this optical scanner is often confronted by a disadvantage of the image displacement or color registration deviation in case of the full-color image forming apparatus due to changes in positions of laser beams while the apparatus is in use. To solve this disadvantage, the following techniques for adjusting the optical components within the optical scanner are known, as disclosed in, for example, Japanese Patent Application Laid-open Nos. 2001-142012, H9-193463, H11-326804, 2004-258182, and Japanese Patent No. 2858735.

According to the technique disclosed in Japanese Patent Application Laid-open No. 2001-142012, scanning time for a scanning performed between two photodiodes is measured, a difference between the measured scanning time and specified time is detected, and mirrors within an optical scanner are rotated by a motor according to a detection result. Feedback control is performed to return the scanning time for the scanning between the two photodiodes to the specified time.

According to the technique disclosed in Japanese Patent Application Laid-open No. H9-193463, a sub-scanning position of a light beam incident on a photosensitive drum is detected to thereby allow a light beam to be incident on a normal sub-scanning write position.

According to the technique disclosed in the Japanese Patent Application Laid-open No. H11-326804, a line drawn on a transfer material is read by a detection sensor, positions of optical components within an optical scanner are changed according to a detection result, and an irradiation position of a light beam on a photosensitive body is thereby adjusted.

According to the technique disclosed in Japanese Patent Application Laid-open No. 2004-258182, a mark drawn on a transfer and transport belt is read by a detection sensor, positions of optical components within an optical scanner are changed according to a detection result, and an irradiation position of a light beam on a photosensitive body is thereby adjusted.

Image forming apparatuses for full-color images have become popular, and there is a demand for further improvement in image quality and acceleration of printing speed. Before realizing high quality image, it is necessary to solve the following disadvantage. If four color images are not accurately registered on the transfer sheet, color registration deviation occurs and a quality of a final image is degraded. To realize both the high quality image and the acceleration of the printing speed, an image forming apparatus that includes an automatic color registration deviation correcting function is normally known as disclosed in Japanese Patent No. 2858735.

The conventional optical scanners and image forming apparatuses including the techniques explained above have the following disadvantages. Attachment positions and shapes of the constituent components and the like are changed due to a heat generated by a unit such as the optical deflector arranged in the optical scanner, transmission and conduction of the heat from a fixing unit or the like. Positions of images drawn on the respective photosensitive drums are gradually displaced. Accordingly, a displacement or color registration deviation in case of a full-color image forming apparatus occurs.

Moreover, to accelerate the printing speed, a driving speed of driving the optical deflector in the optical scanner and a driving speed of driving the transfer unit are accelerated. However, if the optical deflector driving speed is accelerated, in particular, a heat quantity of a motor that drives the optical deflector is increased. The heat generated by the motor adversely influences the other optical components (e.g., a light source, a coupling lens, fθ lenses, elongated lenses such as toroidal lenses) stored in the housing of the optical scanner.

To solve these disadvantages, the techniques disclosed in the above Patent documents are proposed. These techniques are roughly intended to detect light irradiation positions by some means or other, displace the optical components within the optical scanner according to the detection result, and obtain a normal image.

Accordingly, it is necessary to provide at least detection means, arithmetic means for calculating the detection result, an actuator that controls the optical components, and a driving mechanism for the actuator. Pixel densities of currently available image forming apparatuses are mainly around 600 dots per inch (dpi) or 1200 dpi. If the pixel density is around 600 or 1200 dpi, an image is drawn at intervals of 42 or 21 micrometers. It is, therefore, essential to control the drawing interval to be equal to or smaller than 42 or 21 micrometers. To do so, corresponding highly accurate components are required, thereby disadvantageously increasing the cost of the apparatus.

With the technique for drawing the mark on the transfer sheet or transfer body and controlling the optical components according to the marking result, processing time for drawing the mark, erasing the mark, calculating the result etc. is necessary. A user needs to wait during this processing time. Thus, the conventional image forming apparatus is inferior in user friendliness.

Furthermore, with the automatic color registration deviation correcting technique, since the pattern is formed on the belt, detected, and then corrected, the image cannot be printed out during this time. It is, therefore, undesirable to frequently make such an automatic color registration deviation correction that can cause an increase of downtime.

SUMMARY OF THE INVENTION

It is an object of the present invention to at least solve the problems in the conventional technology.

According to an aspect of the present invention, an optical scanner includes at least one light source that emits a light beam, a deflection unit that receives the light beam from the light source and deflects the light beam in a main scanning direction, an optical unit that receives the light beam from the deflection unit and introduces the light beam to a target surface, a housing unit that stores at least one of the light source, the deflection unit, and the optical unit, and a member that directly or indirectly contacts at least one of the light source and the optical unit, wherein at least one of the light source and the optical unit changes in attitude due to a temperature change while the optical scanner is operating, and the member extends or contracts according to the temperature change so as to reduce the change of the attitude.

According to another aspect of the present invention, an image forming apparatus includes an image carrier, an optical scanner that forms a latent image on the image carrier, a developing unit that develops the latent image with a toner, thereby forming a toner image on the image carrier, and a transfer member that transfers the toner image from the image carrier onto a recording medium, wherein the optical scanner includes a single light source that emits a light beam, a deflection unit that receives the light beam from the light source and deflects the light beam in a main scanning direction, an optical unit that receives the light beam from the deflection unit and introduces the light beam to a target surface of the image carrier, a housing unit that stores at least one of the light source, the deflection unit, and the optical unit, and a member that directly or indirectly contacts at least one of the light source and the optical unit, wherein at least one of the light source and the optical unit changes in attitude due to a temperature change while the optical scanner is operating, and the member extends or contracts according to the temperature change so as to reduce the change of the attitude.

According to still another aspect of the present invention, an image forming apparatus includes an image carrier, an optical scanner that forms a latent image on the image carrier, a developing unit that develops the latent image with a toner, thereby forming a toner image on the image carrier, and a transfer member that transfers the toner image from the image carrier onto a recording medium, wherein the optical scanner includes a single light source that emits a light beam, a deflection unit that receives the light beam from the light source and deflects the light beam in a main scanning direction, an optical unit that receives the light beam from the deflection unit and introduces the light beam to a target surface of the image carrier, a housing unit that stores at least one of the light source, the deflection unit, and the optical unit, a member that directly or indirectly contacts at least one of the light source and the optical unit, and a heat source that fixes the toner image onto the recording medium, wherein at least one of the light source and the optical unit changes in attitude due to a temperature change while the optical scanner is operating, and the member extends or contracts according to the temperature change so as to reduce the change of the attitude, and the member receives heat from the heat source directly or indirectly.

According to still another aspect of the present invention, a method of correcting an attitude of an optical scanner, the optical scanner including a single light source that emits a light beam, a deflection unit that receives the light beam from the light source and deflects the light beam in a main scanning direction, an optical unit that receives the light beam from the deflection unit and introduces the light beam to a target surface of the image carrier, a housing unit that stores at least one of the light source, the deflection unit, and the optical unit, and a member that directly or indirectly contacts at least one of the light source and the optical unit, wherein at least one of the light source and the optical unit changes in attitude due to a temperature change while the optical scanner is operating, and the member extends or contracts according to the temperature change so as to reduce the change of the attitude, the method including correcting the change in the attitude of at least one of the light source and the optical unit, and adjusting a position of the light beam on the target surface in the main scanning direction and in a sub-scanning direction orthogonal to the main scanning direction.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 8 is a front cross-sectional view of the optical housing shown in FIG. 7 in a deformed state;

DETAILED DESCRIPTION OF THE PREFERRED EMBODIMENTS

Figure 1:
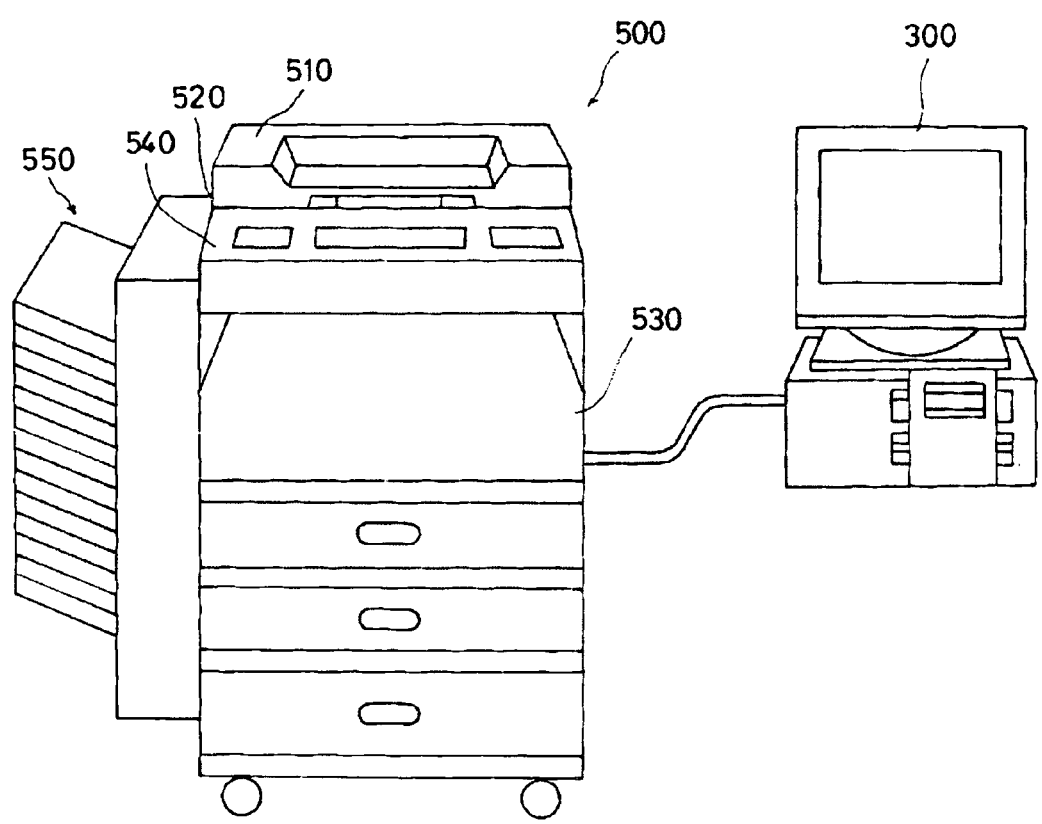
FIG. 1 depicts an example of use of a digital color copying machine according to an embodiment of the present invention being connected to a personal computer.

Exemplary embodiments of the present invention will be described below with reference to accompanying drawings. The present invention is not limited to these embodiments.

In these embodiments, modifications thereof and the like, constituent elements equal in function, shape, or the like are designated by like reference numerals or symbols, or related reference numerals or symbols so as to avoid redundant explanations of the constituent elements as much as possible. For brevity of illustration of the drawings and explanation of the descriptions, even constituent elements supposed to be shown are omitted in the drawings without indications, if it is not necessary to specifically explain the elements.

With reference to FIG. 1, an example of use of an image forming apparatus according to an embodiment of the present invention is explained. In FIG. 1, a digital color copying machine 500 as one example of the image forming apparatus includes multifunction and configuration by including an automatic document feeder (ADF) 500, a document reader 520, a color laser printer 530, an operation panel 540, a sorter 550, and the other devices or the like. The automatic document feeder (ADF) 500 automatically feeds a document to a read unit (not shown), and the document reader 520, also referred to as scanner, reads an image of the document (not shown). The color laser printer 530 performs a write operation and an imaging operation and forms a desired image based on image data which is read image information or image data transmitted from a personal computer 300 (which is one example of a computer) through a communication interface. The operation panel 540 transmits an operation instruction to each device or unit and displays a state of the device or unit. The sorter 550 performs distribution, sorting, or the like for transfer sheets on each of which an image is formed.

The color laser printer 530 is communicably connected to the personal computer 300, a word processor or a facsimile, and includes an image data output device that serves as a reception unit of the personal computer 300, the word processor or the facsimile.

Figure 2:
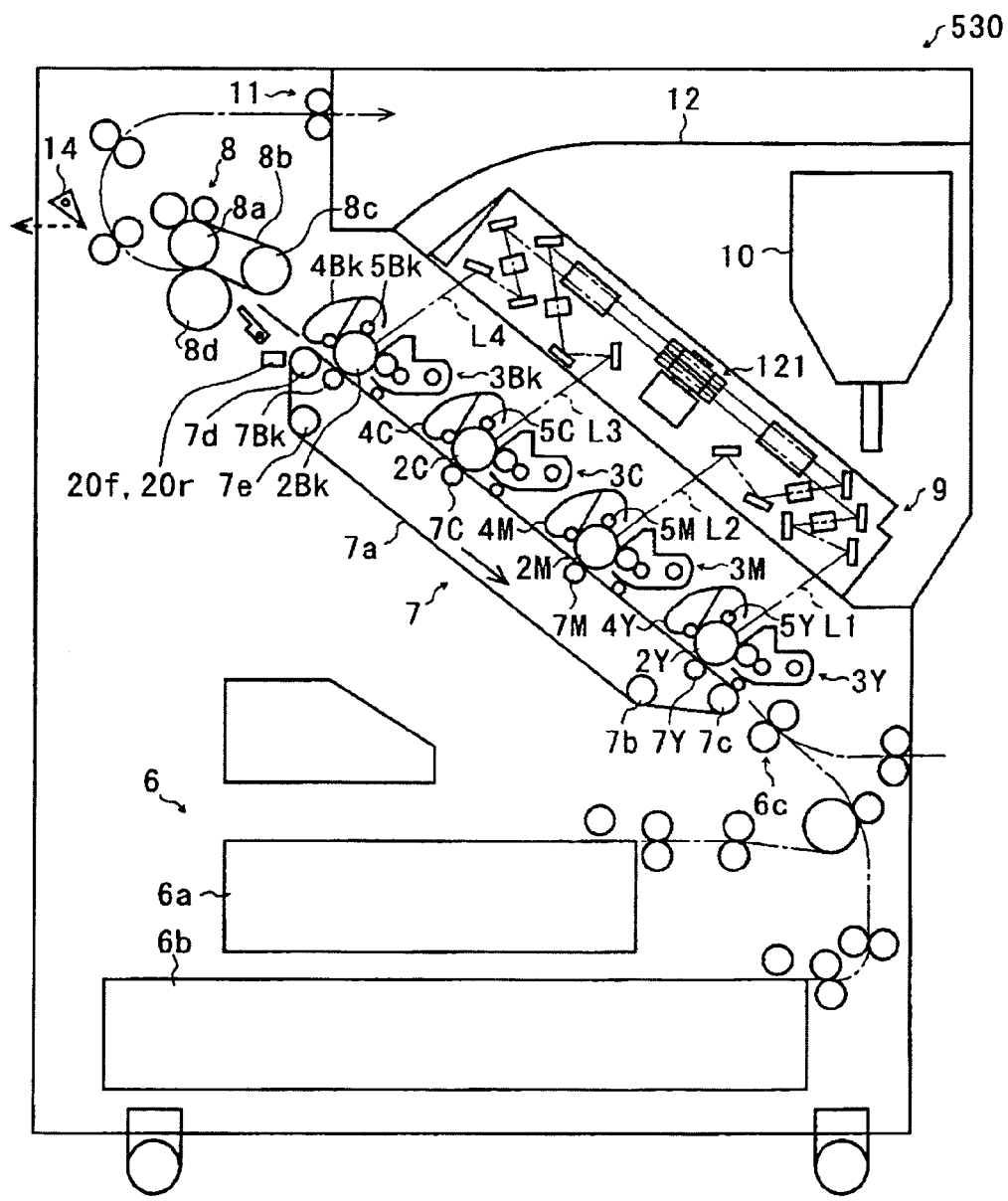
FIG. 2 is a schematic front view of a color laser printer as one example of a direct transfer type quadruple tandem full-color image forming apparatus according to the embodiment of the present invention.

With reference to FIG. 2, an overall configuration of the image forming apparatus to which the present invention is applied is be explained.

FIG. 2 depicts the color laser printer 530 shown in FIG. 1. As shown in FIG. 2, the color laser printer 530 includes photosensitive drums 2Y, 2M, 2C, and 2Bk serving as image carriers, developing devices 3Y, 3M, 3C, and 3Bk, cleaning devices 4Y, 4M, 4C, and 4Bk, charging devices 5Y, 5M, 5C and 5Bk, a paper feeder 6, a transfer device 7, a fixing device 8, an optical scanner 9, and the like. The color laser printer 530 is a so-called direct transfer type quadruple tandem full-color image forming apparatus.

The photosensitive drums 2Y, 2M, 2C, and 2Bk are rotatably supported generally at a center of the color laser printer 530 and arranged equidistantly so as to align rotation axis centers thereof. The optical scanner 9, to be explained later, performs a write operation, thereby forming electrostatic latent images for a yellow image, a magenta image, a cyan image, and a black image on the photosensitive drums 2Y, 2M, 2C, and 2Bk, respectively.

The developing devices 3Y, 3M, 3C, and 3Bk are provided near outer circumferential surfaces of the corresponding photosensitive drums 2Y, 2M, 2C, and 2Bk, respectively. Development rollers that supply development agents to the circumferential surfaces of the corresponding photosensitive drums 2Y, 2M, 2C, and 2Bk are provided in the respective developing devices 3Y, 3M, 3C, and 3Bk. The development agents of corresponding colors are supplied to the respective developing devices 3Y, 3M, 3C, and 3Bk from a toner supply container 10.

The cleaning devices 4Y, 4M, 4C, and 4Bk and the charging devices 5Y, 5M, 5C, and 5Bk are provided near the outer circumferential surfaces of the corresponding photosensitive drums 2Y, 2M, 2C, and 2Bk, respectively. The cleaning devices 4Y, 4M, 4C, and 4Bk are provided downstream of the developing devices 3Y, 3M, 3C, and 3Bk in a rotation direction of the respective photosensitive drums 2Y, 2M, 2C, and 2Bk. The charging devices 5Y, 5M, 5C, and 5Bk are provided downstream of the cleaning devices 4Y, 4M, 4C, and 4Bk, respectively. The photosensitive drums 2Y, 2M, 2C, and 2Bk the outer circumferential surfaces of which are cleaned and charge-neutralized by the cleaning devices 4Y, 4M, 4C, and 4Bk are charged by the charging devices 5Y, 5M, 5C, and 5Bk for preparation of a next image forming operation.

The paper feeder 6 is provided in a lower portion of the color laser printer 530. The paper feeder 6 includes a plurality of paper feed trays 6a and 6b that store transfer sheets, which are one example of sheet-like recording mediums, a manual feed tray (not shown), a pair of registration rollers 6c, which feeds a transfer sheet toward a portion between the photosensitive drums 2Y, 2M, 2C, and 2Bk and the transfer device 7, to be explained later, and the like. A plurality of roller members for feeding the transfer sheet are arranged between each of the paper feed trays 6a and 6b and the manual feed tray (not shown), and the registration rollers 6c. The transfer sheet from each tray is fed to the registration rollers 6c via a paper feed and transport path indicated by a one-dot chain line in FIG. 2.

The transfer device 7 is provided in the color laser printer 530 to be located below the photosensitive drums 2Y, 2M, 2C, and 2Bk. The transfer device 7 includes a transfer belt 7a including a high resistance endless belt and serving as a transfer body, and a plurality of rollers 7b, 7c, 7d, and 7e on which the transfer belt 7a is spread. The transfer belt 7a is moved in an arrow direction shown in FIG. 2 while contacting with the outer circumferential surfaces of the photosensitive drums 2Y, 2M, 2C, and 2Bk. In addition, transfer rollers 7Y, 7M, 7C, and 7Bk, to which a transfer bias is applied, are arranged at positions at which the transfer rollers 7Y, 7M, 7C, and 7Bk are opposite to the photosensitive drums 2Y, 2M, 2C, and 2Bk across the transfer belt 7a, respectively while contacting circumferential surfaces of the transfer rollers 7Y, 7M, 7C, and 7Bk with a rear surface of the transfer belt 7a. The roller 7d is set to serve as a driving roller.

The fixing device 8 is provided in the color laser printer 530 to be located downstream of the transfer device 7 in the transfer sheet transport direction. The fixing device 8 includes a function and a configuration as fixing means for fixing a toner image transferred onto the transfer sheet to the transfer sheet or as a heat source. The fixing device 8 includes therein a heater, which is substantially the heat source, and includes a heating roller 8a driven to rotate clockwise, a driven roller 8c that rotates to follow the heating roller 8a through a belt 8b, a pressure roller 8d press-contacted with the belt 8b on the heating roller 8a by a predetermined pressure contact force, and the like.

The transfer sheet onto which the toner image transferred onto an upper surface of the transfer sheet is fixed by being heated and pressurized is guided and transported to either a paper discharge path indicated by a one-dot chain line or a sorter transport path indicated by a solid line by a switchover. Namely, in a state in which a paper discharge branch claw 14 is located as shown in FIG. 2, the transfer sheet onto which the toner image is fixed is discharged to the outside of the color laser printer 530 by a plurality of intermediate discharge roller pairs and a pair of discharge rollers 11 arranged on the paper discharge path. In a state in which the paper discharge branch claw 14 is vibrated and displaced counterclockwise so that a point region in a diagonally right lower portion of the claw 14 is set generally horizontal, the transfer sheet onto which the toner image is fixed is transported and discharged to the sorter 550 through the sorter transport path indicated by the broken line. The sorter 550 performs an operation, thereby distributing or sorting transfer sheets to a plurality of bin trays in a desired fashion.

Figure 3:
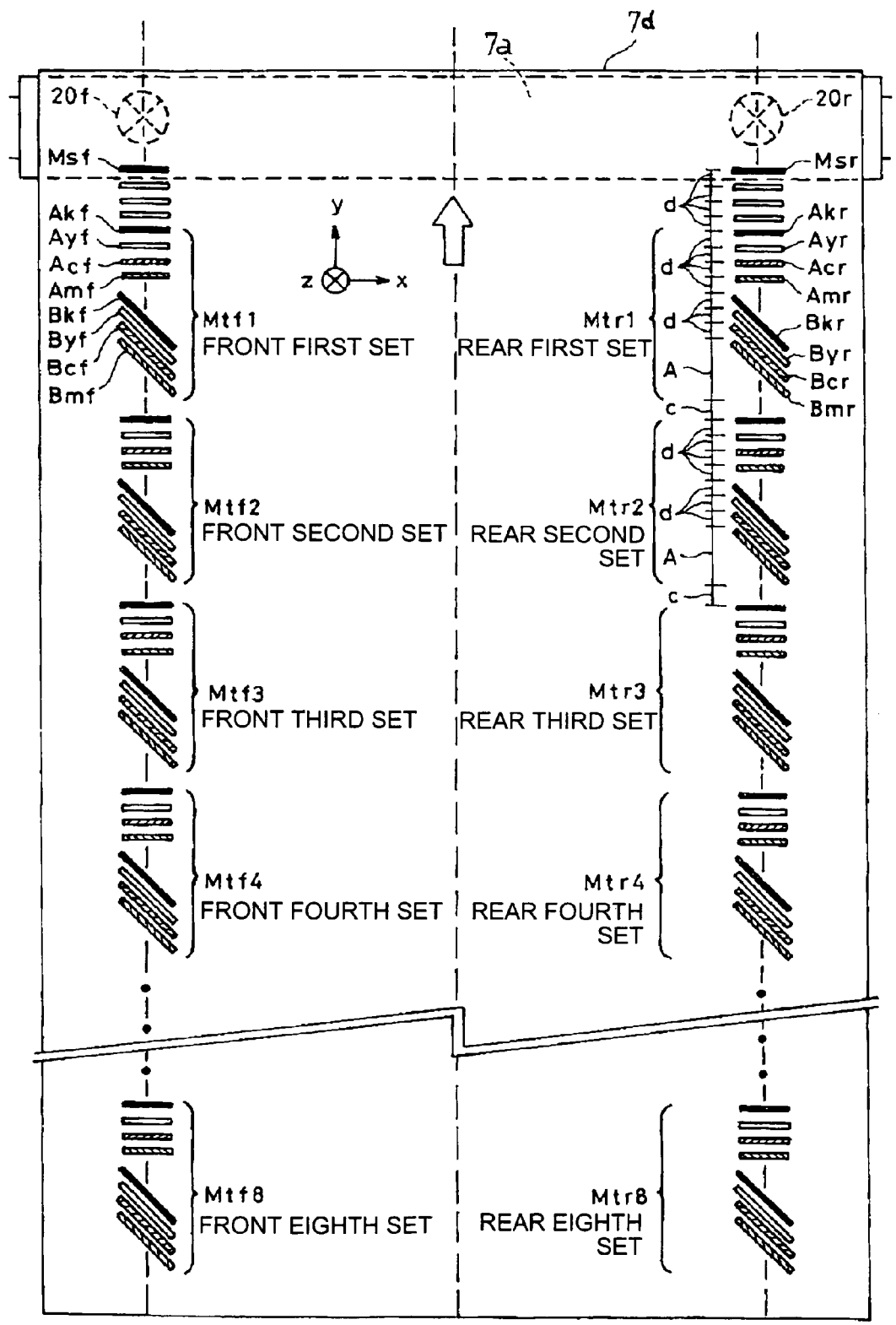
FIG. 3 is a plan view of a correction pattern formed on a transfer belt of the color laser printer shown in FIG. 2 during automatic color matching control.

The color laser printer 530 includes an automatic color registration deviation correcting means capable of performing an automatic color registration deviation correction control also referred to as automatic color matching correction control for correcting color registration deviation among the respective colors during formation of a color (multicolor) image. Namely, as shown in FIGS. 2 and 3, the color laser printer 530 includes optical sensors 20f and 20r that detect a color image formed on the transfer belt 7a and that are provided near the transfer belt 7a. In addition, the color laser printer 530 adopts the color registration deviation correcting means equal in configuration to, for example, color registration deviation correcting means disclosed in Japanese Patent Application Laid-Open No. 2002-207337 filed by the applicant of the present application. It is thereby possible to keep an image displacement and color registration deviation in a better state and continuously perform a better image forming operation.

Figure 5:
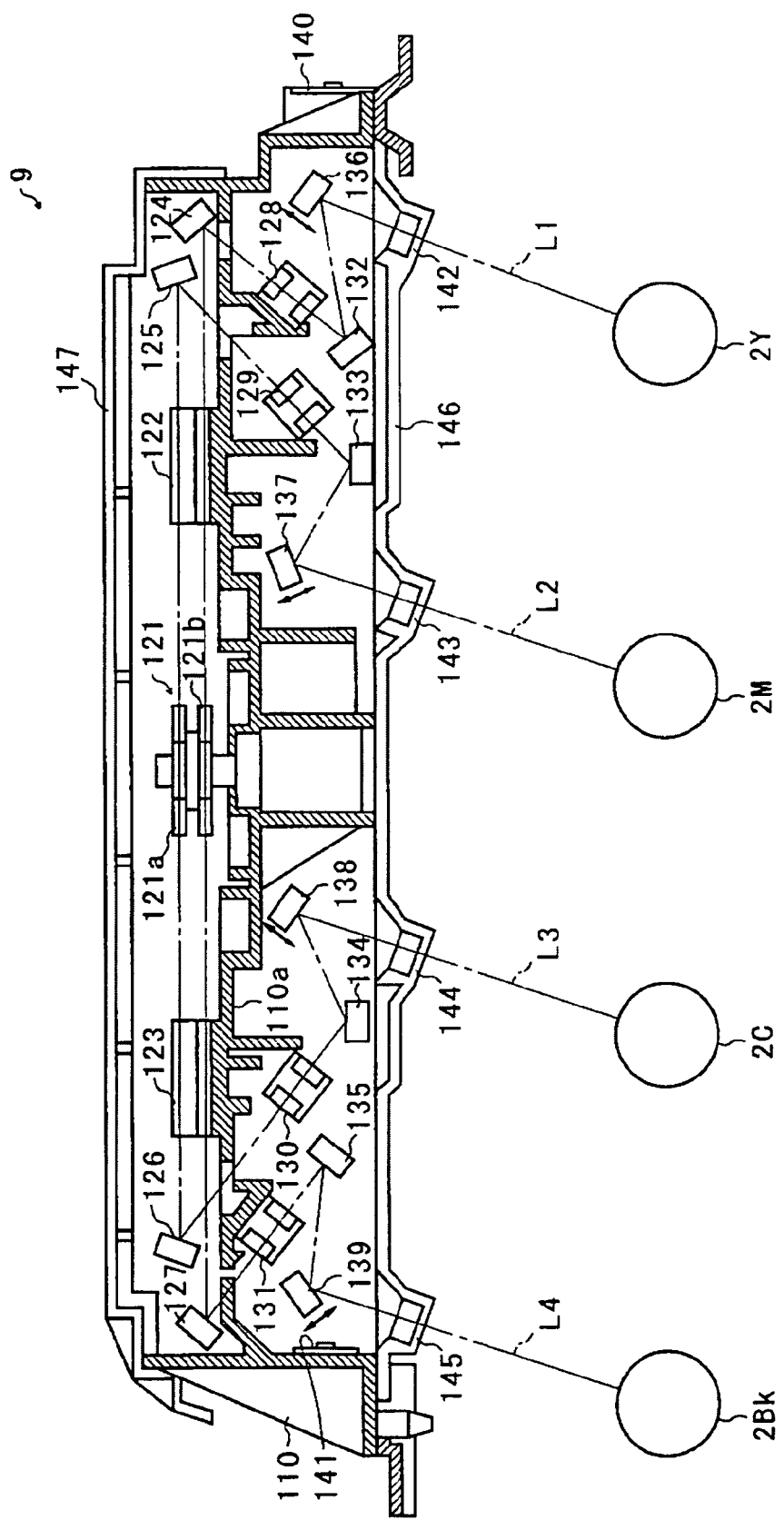
FIG. 5 is a cross-sectional view of the optical housing of the optical scanner employed in the color laser printer shown in FIG. 2 and the optical path.

FIG. 3 is one example of a correction pattern (patterns of marks of respective colors formed on the surface of the transfer belt 7a) under the automatic color registration deviation correction control, similarly to that shown in FIG. 5 of the 2002-207337.

The optical scanner 9 that is a characteristic element of the present invention is provided in the color laser printer 530 to be located above the photosensitive drums 2Y, 2M, 2C, and 2Bk and below the paper discharge tray 12. The optical scanner 9 is explained below in detail with reference to FIGS. 4 to 6.

Figure 4:
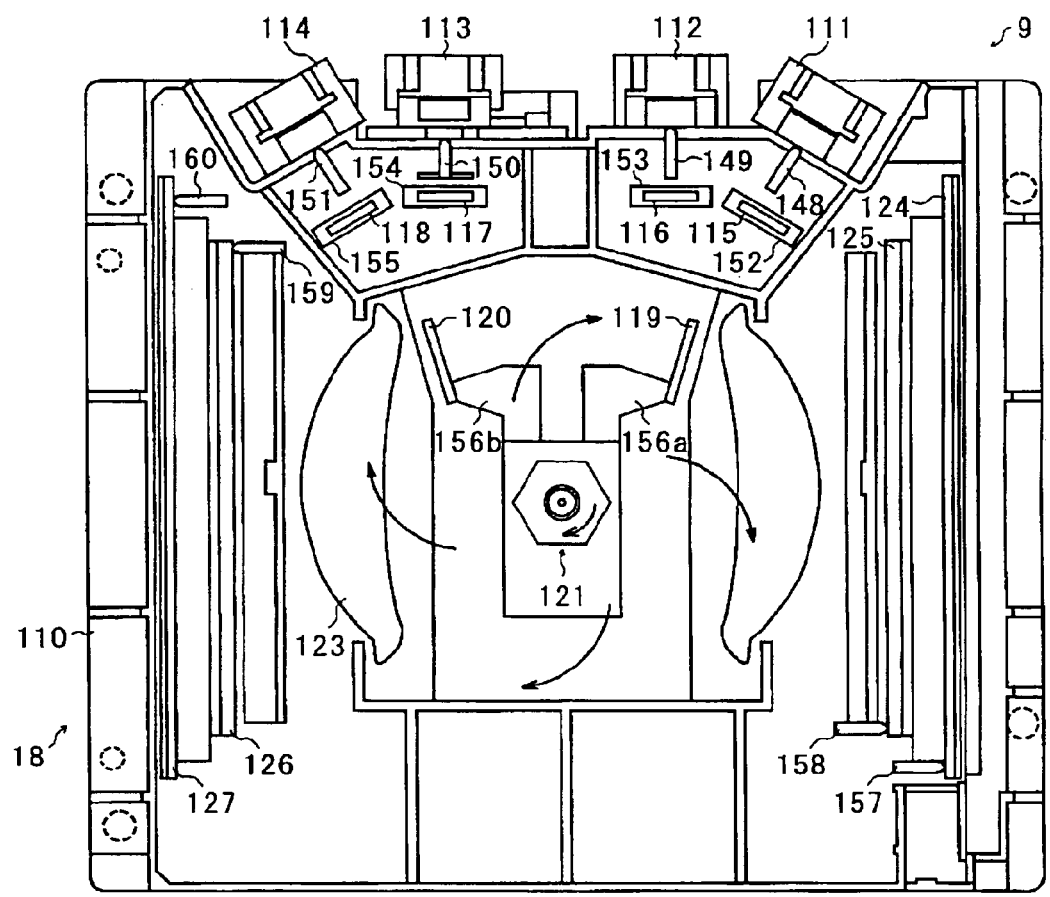
FIG. 4 is a plan view of an internal configuration of an optical housing of an optical scanner employed in the color laser printer shown in FIG. 2 and an optical path.
Figure 6:
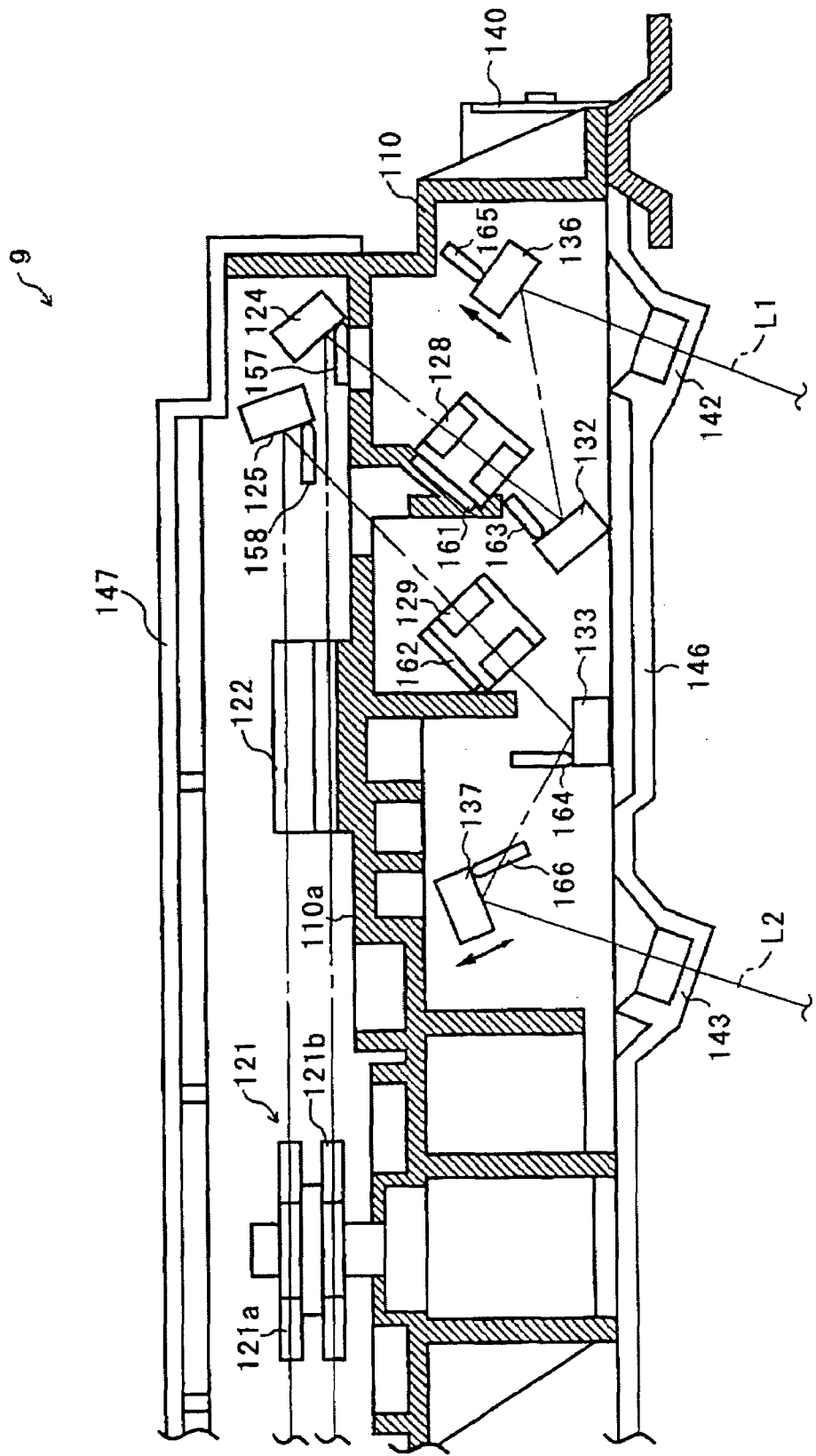
FIG. 6 is an enlarged cross-sectional view of relevant parts shown in FIG. 5.

As shown in FIGS. 4 to 6, the optical scanner 9 includes an optical housing 110 serving as housing means for storing constituent components (constituent elements) to be explained later. The optical housing 110 is integrally made of a resin material such as PC/ABS (heat conductivity of 0.6 W/mK).

The optical scanner 9 includes four light source units 111, 112, 113, and 114 serving as light source means for emitting laser beams L1, L2, L3, and L4 as light beams, an optical deflector 121, and a transmission and imaging optical system (constituted by optical components such as imaging lenses 122, 123, 128, 129, 130, and 131, and optical path folding mirrors 124, 125, 126, 127, 132, 133, 134, 135, 136, 137, 138, and 139). The optical deflector 121 serves as deflection means for distributing the laser beams L1, L2, L3, and L4 emitted from the light source units 111, 112, 113, and 114 into two symmetric directions, deflecting them, and subjecting them to a main scanning. These constituent optical components are stored in the single optical housing 110. Extendible members 148 to 166 characteristic of the present invention to be explained later are attached at predetermined positions, respectively so as to contact with the optical components either directly or indirectly.

It is noted that the light source units 111, 112, 113, and 114 are also referred to as lasers 111, 112, 113, and 114, respectively.

Covers 146 and 147 that cover up the constituent components and the like stored in the optical housing 110 are provided in an upper portion and a lower portion of the optical housing 110, respectively. The lower cover 146 includes an opening to cause laser beams to pass through, and dustproof glasses 142, 143, 144, and 145 are attached to the opening.

The optical scanner 9 converts the image data transmitted and input from the document reader 520 or the image data output device (the reception unit or the like of the personal computer 300, the word processor or the facsimile machine) and subjected to a color separation into a light source driving signal. The laser beams emitted from the light source units 111, 112, 113, and 114 in response to the light source driving signal are passed through cylindrical lenses 115, 116, 117, and 118 for optical face tangle error correction, introduced into the optical deflector 121 either directly or through mirrors 119 and 120, and deflected and scanned in the two symmetric directions by two (upper and lower) polygon mirrors 121a and 121b driven to rotate at a constant velocity by a polygon motor (not shown). The optical deflector 121 includes a plurality of planes of deflection (six planes of deflections in the example of FIG. 4).

Figure 7:
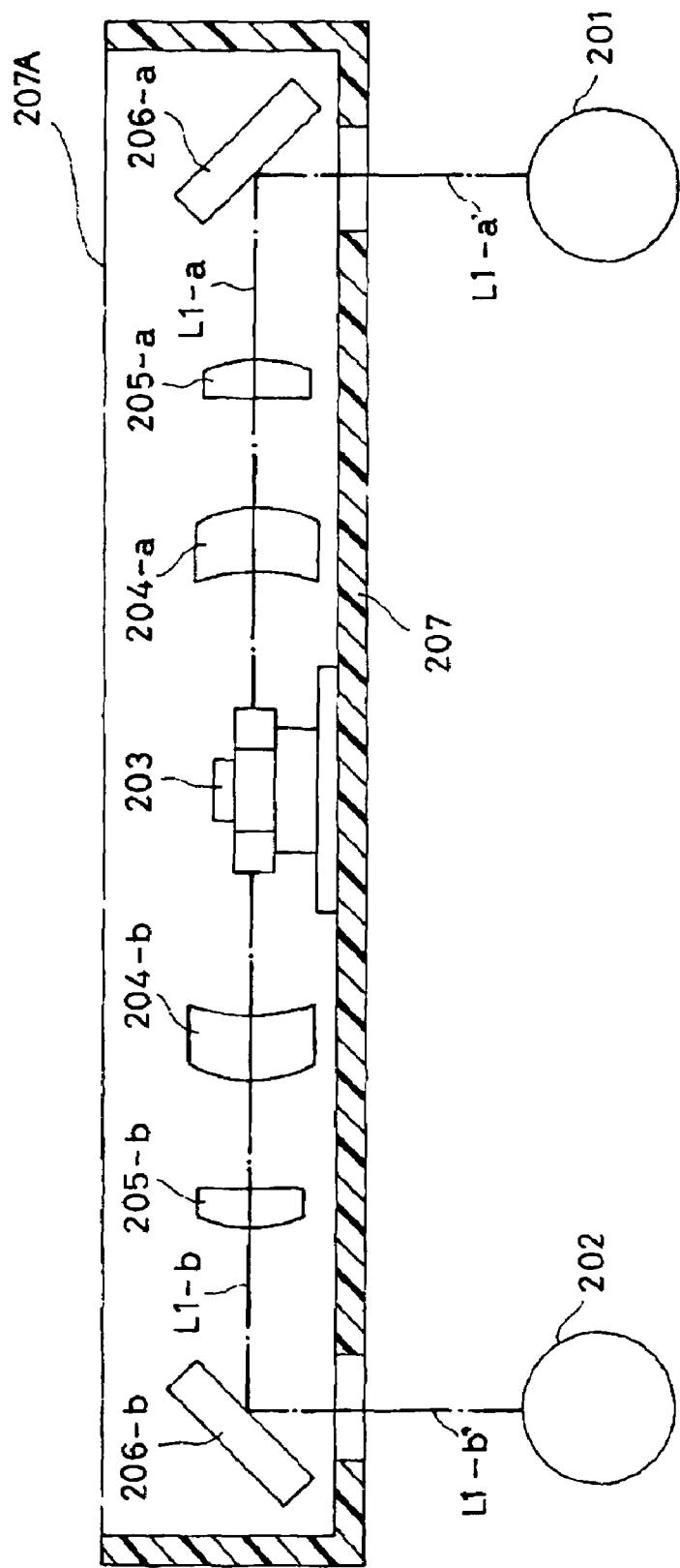
FIG. 7 is a front cross-sectional view of the optical housing of the optical scanner in a normal state.

With the configuration shown in FIGS. 5 and 6, the upper polygon mirror 121a for the laser beams L2 and L3 and the lower polygon mirror 121b for the laser beams L3 and L4 are separately provided in an upper and lower tier. Alternatively, the optical scanner 9 can be configured so that a single thick polygon mirror similar to that shown in, for example, FIGS. 7 and 8, deflects and scans the four laser beams L1, L2, L3, and L4.

The pairs of laser beams deflected and scanned in two directions by the polygon mirrors 121a and 121b of the optical deflector 121 are passed through the first imaging lenses 122 and 123 each constituted by a fθ lens having two (upper and lower) layer structures consisting of, for example, a resin material, respectively. The four laser beams L1, L2, L3, and L4 are folded by the first folding mirrors 124, 125, 126, and 127, respectively, passed through an opening of a base 110a formed integrally with the optical housing 110, passed through the second imaging lenses 128, 129, 130, and 131 each consisting of, for example, a wide toroidal lens (WTL). In addition, the four laser beams L1, L2, L3, and L4 are irradiated onto scanning target surfaces of the photosensitive drums 2Y, 2M, 2C, and 2Bk for the respective colors through the second folding mirrors 132, 133, 134, and 135, the third folding mirrors 136, 137, 138, and 139, and the dustproof glasses 142, 143, 144, and 145. Electrostatic latent images are thereby drawn on the respective scanning target surfaces thereof.

The optical components arranged on the optical paths between the light source units 111, 112, 113, and 114 and the optical deflector 121, that is, the cylindrical lenses 115, 116, 117, and 118 for optical face tangle error correction, and the mirrors 119 and 120 constitute a first optical system serving as first optical means. The optical components arranged on the optical paths between the optical deflector 121 and the scanning target surfaces of the photosensitive drums 2Y, 2M, 2C, and 2Bk, that is, the first imaging lenses 122 and 123, the first folding mirrors 124, 125, 126, and 127, the second imaging lenses 128, 129, 130, and 131, the second folding mirrors 132, 133, 134, and 135, and the third folding mirrors 136, 137, 138, and 139 constitute a second optical system serving as second optical means.

In the optical scanner 9, the four light source units 111, 112, 113, and 114 are each constituted by a semiconductor laser (LD), which is substantially a light source and serves as a laser, and a collimator lens that collimates a light flux emitted from the LD. The LD and the collimator lens are integrally assembled into a holder. However, the light source unit for black frequently used during formation of monochrome images (e.g., the light source unit 113) can have a multi-beam configuration including two or more LDs and the collimator lens so as to enable writing an image at high speed. With this multi-beam configuration, if the light source unit is provided on a sidewall of the optical housing 110 to be rotatable about a light axis, then a beam pitch in a sub-scanning direction can be adjusted and a pixel density can be switched over (to, for example, 600 dpi or 1200 dpi) during formation of monochrome images.

Furthermore, a synchronous detection mirror (not shown) for extracting a light flux at a scanning start position in a main scanning direction is provided on an optical path of each of the laser beams L1, L2, L3, and L4. The light flux reflected by this synchronous detection mirror is received by synchronous detectors 140 and 141, thereby outputting a scanning start synchronous signal.

A scanning direction of the laser beam deflected and scanned by the optical deflector 121 corresponds to the main scanning direction, which direction is an axial direction of the photosensitive drums 2Y, 2M, 2C, and 2Bk. A direction orthogonal to this main scanning direction corresponds to the sub scanning direction, which direction is a rotation direction of the photosensitive drums 2Y, 2M, 2C, and 2Bk (a moving direction of surfaces of the photosensitive drums 2Y, 2M, 2C, and 2Bk).

The polygon mirrors 121a and 121b of the optical deflector 121 normally rotate at quite high speed of 10,000 to 50,000 rounds per minute (rpm). Accordingly, a large quantity of heat is emitted from a bearing and a motor coil and motor driver of the optical deflector 121. The heat emitted from a motor (not shown) serving as driving means for driving the optical deflector 121 or the like is transmitted to the optical housing 110 in direct contact with the optical deflector 121. Besides, according to the embodiment, the heat emitted from the fixing device 8 (particularly the heating roller 8a) arranged near the optical scanner 9 is also transmitted to the optical housing 110. The optical housing 110 is thereby thermally deformed. The thermal deformation of the optical housing 110 causes a change in attachment positions, i.e., attitudes of the light source units 111 to 114 and the optical components arranged within the optical housing 110.

Considering this, the embodiment is most characterized by providing extensible members contacting with the respective optical components the attitudes of which are changed during use of the optical scanner 9 either directly or indirectly, extended or contracted according to a temperature change, and thereby reducing the change in the attitudes of the light source units 111 to 114 and the optical components.

By way of example, as shown in FIGS. 4, 6, 10, and 18 to 20, extensible members 148 to 166, 209, 215, and 218 extended or contracted according to the temperature change, that is, extended (expanded and displaced) when the heat is applied from a certain temperature (e.g., ordinary temperature), contracted due to a temperature fall resulting from gradually driving off the heat from this temperature rise state, returned to an original state, or further contracting from the original state by further cooling are arranged within the optical scanner 9. One end of each of the extensible members 148 to 166, 209, 215, and 218 is brought into direct (or indirect) contact with one of the optical components and the light source units 111 to 114.

The extensible members 148 to 166, 209, 215, and 218 are made of a material that enables exhibiting this function, for example, ABS resin, PC resin, a mixture of these resins at an appropriate mixture ratio or an appropriate engineering plastic material. However, the material for the extensible members 148 to 166, 209, 215, and 218 is not limited to the resins but can be metal as explained later.

Figure 9A:
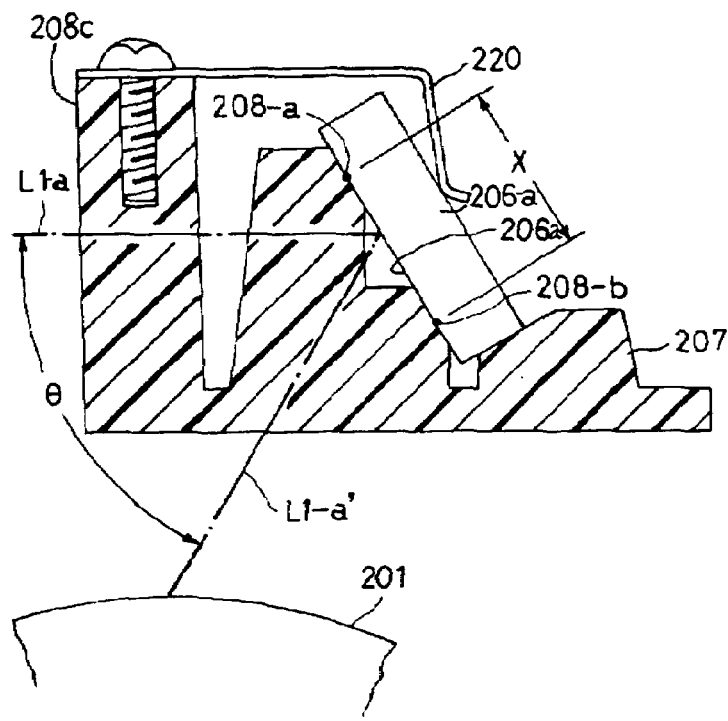
FIGS. 9A and 9B are cross-sectional views of relevant parts of a mirror in the normal state shown in FIG. 7 and those of the mirror in the deformed state shown in FIG. 8, respectively.
Figure 9B:
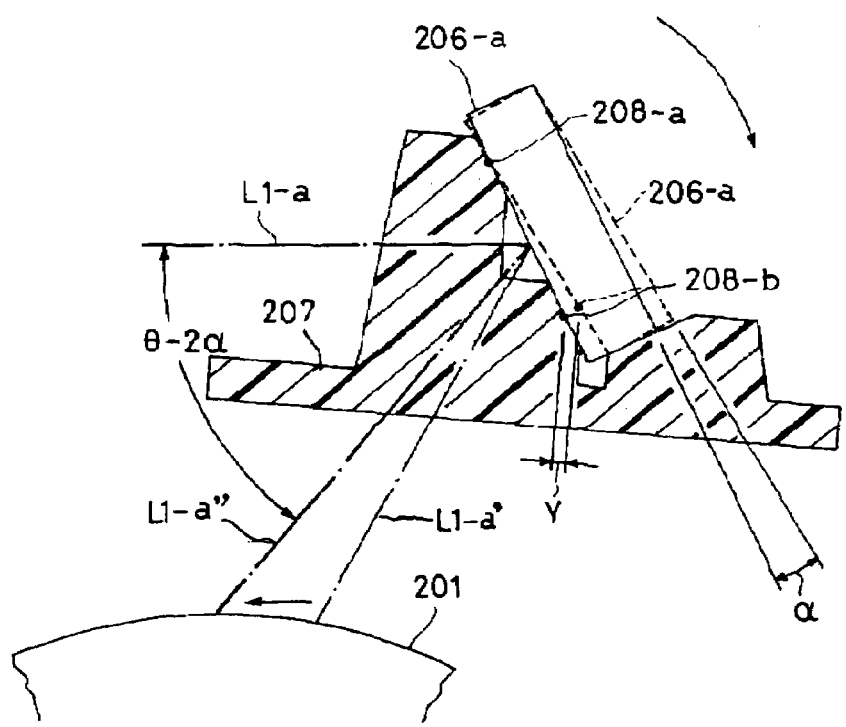

According to the conventional technique, if the extensible members are not arranged differently from the present invention, the optical components are deformed during use of the optical scanner 9 as shown in FIGS. 8 and 9B. Due to this, the exposure position of the laser beam on each photosensitive drum is deviated from an intended position. To solve this disadvantage, according to the present invention, each extensible member is brought into contact with part of the optical components and displaced so as to cancel the displacements of the optical components by this thermal expansion.

Basic functions of the extensible members according to the present invention are explained with reference to FIGS. 10A and 10B, in comparison to the conventional technique shown in FIGS. 9A and 9B.

Figure 10A:
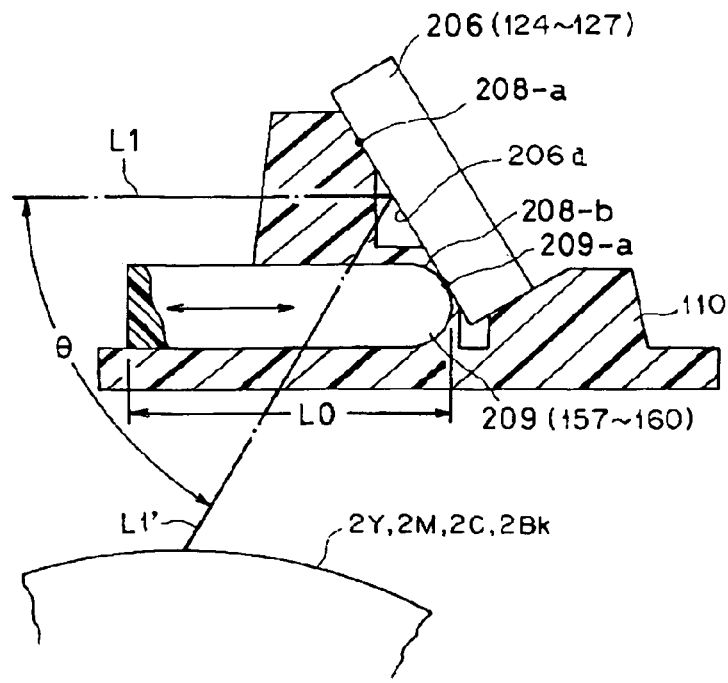
FIGS. 10A and 10B are cross-sectional views of relevant parts of a mirror in the normal state shown in FIG. 7 and those of the mirror in the deformed state shown in FIG. 8, respectively, including an extensible member.
Figure 10B:
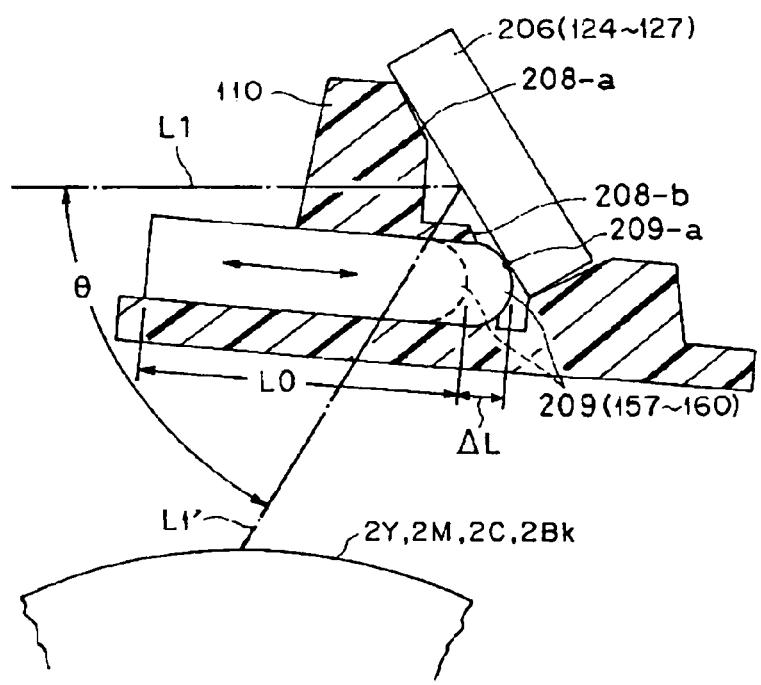

A folding mirror 206 that exhibits a notable effect among the optical components having attitude changes is typically explained as shown in FIGS. 10A and 10B. Namely, the attitude change in the folding mirror 206 if an extensible member 209 is arranged to be contacted with the folding mirror 206 either directly or indirectly is explained.

In FIGS. 10A and 10B, the folding mirror 206 (hereinafter, also simply referred as mirror 206) is a generic term for the first to the third folding mirrors 124 to 139 shown in FIGS. 4 to 6. Among them, the four first folding mirrors 124 to 127 are typically indicated in parentheses. The mirror 206 shown in FIGS. 10A and 10B corresponds to the folding mirror 206-a shown in FIGS. 9A and 9B. Likewise, the extensible member 209 shown in FIGS. 10A and 10B is a general term for the extensible members 157 to 160 and 163 to 166 shown in FIGS. 4 and 6. Among them, the four extensible members 157 to 160 are typically indicated in parentheses. The photosensitive drum 2Y, 2M, 2C, or 2Bk corresponds to the photosensitive drum 201 shown in FIGS. 9A and 9B. Likewise, the optical housing 110 shown in FIG. 10 corresponds to the optical housing 207 shown in FIGS. 9A and 9B.

For brevity of illustration, in FIGS. 10A and 10B, the hatching of the mirror 206 is not given and the plate spring 220 shown only in FIG. 9A is not shown. In FIGS. 10A and 10B, therefore, a rear side of the mirror 206 is urged by the plate spring (not shown) so as to be always in contact with reception surfaces 208-a and 208-b of the optical housing 110. In relation to the extensible member 209 shown in FIGS. 10A and 10B, hatching that represents a cross section of the extensible member 209 is given only in part of FIG. 10A and not shown in FIG. 10B for brevity of illustration.

As partially explained in the Background of the Invention part, FIGS. 9A and 10A depict a state in which the mirror 206-a or 206 as one optical component within the optical scanner is at a normal arrangement position. The laser beam L1-a or L1 emitted from the light source unit (not shown) is struck against the mirror 206-a or 206, reflected by the mirror 206-a or 206 at the angle θ, irradiated on the photosensitive drum 201 as the light beam L1-a' or L1', and thereby exposed on the surface of the photosensitive drum 201. The mirror 206-a or 206 is supported by the reception surfaces 208-a and 208-b of the resin optical housing 207 or 110. In FIG. 10A, one end (a free end) 209-a of the extensible member 209 in an initial state (e.g., ordinary temperature state) contacts with a lower end of the mirror 206, so that the lower end of the mirror 206 is supported by one end 209-a of the extensible member 209.

In FIGS. 10A and 10B, the one right end (free end) 209-a of the extensible member 209 displaceably contacts with the lower end of the mirror 206 whereas the left or other end (proximal end) thereof is fixed to a part of the optical housing 110, which is an immovable member in the optical scanner 9, through fastening means such as a spring, bonding means such as an adhesive or the like.

FIG. 9B depicts the state in which several time passes since the conventional optical scanner operates. This corresponds to the state when the optical housing 207 is thermally deformed by heat or the like as shown in FIG. 8 and the attitude of the mirror 206-a is changed (the mirror 206-a rotates in the arrow direction in FIG. 9B). This means that the attitude of the mirror 206-a is displaced by as much as a and that a horizontal displacement amount of the mirror reception surface 208-b at this time is Y. Thus, the laser beams L1-a from the light source is exposed on the photosensitive drum 201 at the reflection angle changed from θ to θ-2α. As can be seen, the change in the attitudes of the optical components such as the folding mirrors causes a deviation in the intended exposure position.

According to the embodiment, by contrast, as shown in FIG. 10B, the one end or free end of the extensible member 209 having a natural length L0 contacts with a reflecting surface 206a of the mirror 206. Thanks to this, even if the optical housing 110 is thermally deformed and displaced by an operation of the optical scanner 9, the lower end of the mirror 206 is pressed against the urging force of the plate spring (not shown) by expansion or contraction of the extensible member 209 in the arrow direction (in this example, by expansion and displacement due to thermal expansion to a length of L0+ΔL). Therefore, the reflection angle θ equal to that before use of the optical scanner 9 (e.g., in the ordinary temperature state) is kept. Namely, if the extensible member 209 is provided, the lower end of the mirror 206, which is displaced clockwise, is pressed by one end 209-*a* of the extensible member 209 by as much as a displacement amount ΔL, the attitude of the mirror 206 is kept in the original state and the reflection angle θ is kept constant. At this moment, the mirror 206 is supported by the reception surface 208-*a* of the optical housing 110 and one end 209-*a* of the extensible member 209. Needless to say, the angle change α of the mirror 206 and the displacement amount ΔL of the extensible member 209 should be set appropriately to maintain the reflection angle θ of the mirror 206. To do so, it suffices to tune the angle change α of the mirror 206 and the displacement amount ΔL of the extensible member 209 in the optical scanner. It is, therefore, possible to employ the optical scanner of the present invention as any optical scanner.

The displacement amount ΔL of the extensible member 209 can be determined according to the angle change a of the mirror 206 and a difference Y in relative position between the mirror reception surfaces 208-*a* and 208-*b* displaced when the mirror 206 rotates by as much as α. This difference Y is calculated as shown in the following expression if a distance between the mirror reception surfaces 208-*a* and 208-*b* is X and the angle change of the mirror 206 (mirror rotation angle) α is sufficiently small.

$$Y \approx X \sin \alpha$$

Depending on the type of the optical scanner or another optical component within the optical scanner, a mirror displacement direction is different from that according to the embodiment. Even in that case, the optical scanner according to the embodiment can be applied by changing the attachment position of the extensible member.

Furthermore, it is obvious that the optical scanner according to the embodiment can be applied to a linear displacement, i.e., a displacement of the attachment position in vertical or horizontal direction other than the displacement of the optical component in the rotation direction.

The heat emitted from the motor or the like is directly transmitted to the optical housing 110 and the extensible members 156*a* and 156*b* in direct contact with the optical deflector 121. In addition, the heat is also transmitted to the optical housing 110 and the extensible members 148 to 166 through hot air currents (indicated by four spiral arrows shown in FIG. 4) generated by the polygon mirrors 121*a* and 121*b* as shown in FIG. 4. The heat is particularly applied to the extensible members 156*a*, 156*b*, 157, 158, 159, and 160 located leeward of the hot air current indirectly by the optical deflector 121 that is a heat source.

As shown in FIG. 6, the optical deflector 121 that serves as the heat source contacts with and is thereby held by the base 110*a* of the optical housing 110, so that the heat from the heat source (optical deflector 121) is transmitted to the optical housing 110. At this time, the extensible members 156*a*, 156*b*, 157, 158, 163 to 166 and the like are indirectly heated by the optical housing 110 warmed by this heat transmission.

Needless to say, the extensible members can be arranged so that one end of each extensible member contacts with the heat source (optical deflector 121) and the other end thereof contacts with the optical component.

The heat is also transmitted to the extensible members 148 to 166 through the optical housing 110. The optical housing 110 is thermally deformed by the applied heat. The reception surface of each optical component is mainly constituted by the optical housing 110 and is, therefore, displaced by the thermal deformation of the optical housing 110. At this time, the respective extensible members 148 to 166 are extended or contracted by the temperature change due to heat history. The change in the attitudes of the optical components is, therefore, reduced.

At this time, the optical components differ in the displacement amount of the reception surface from one another according to a shape and a material of the optical housing, an arrangement position and a shape of the heat source, a distance from the heat source, a rotation speed and a rotation direction of the optical deflector 121 serving as the heat source or the like. Considering this difference, the extensible members 148 to 166 independent of one another are attached to the optical components either directly or indirectly so as to minimize the displacement amount. To determine shapes and coefficients of linear expansion of the extensible members 148 to 166, displacement amounts of the respective optical components are measured.

Even if the displacement amounts of the reception surfaces of the optical components are equal, displacement amounts of imaging positions of the laser beams on the photosensitive drums 2Y, 2M, 2C, and 2Bk differ depending on arrangement of the respective optical components. For instance, in the optical scanner shown in FIG. 5, if the first folding mirror 124 has an angle change of 10 degrees among the optical components, the imaging position of the laser beam on the photosensitive drums 2Y is changed by about 1 millimeter. On the other hand, if the third folding mirror 136 has an angle change of 10 degrees among the optical components, the imaging position of the laser beam on the photosensitive drums 2Y is changed by as much as about 0.5 millimeter, which amount is half of that of the laser beam on the photosensitive drums 2Y.

Conversely, if the change amount of the imaging position of the laser beam on the photosensitive drum 2Y is known, the displacement amount ΔL of the extensible member relative to the first folding mirror 124 or the third folding mirror 136 can be determined. For instance, if the change amount of the imaging position on the photosensitive drum 2Y is known as 1 millimeter, the angle change of the mirror can be set to about 10 degrees. A length of the reception surface of the first folding mirror 124 in the sub-scanning direction is 10 millimeters. To change the angle of the first folding mirror 124 by about 10 degrees, the change amount of the imaging position can be set so that a relative positional relationship and the reception surface of the first folding mirror 124 and the extensible member is 10 sin (10 degrees) ≅0.03 millimeter. Namely, the shape and the coefficient of linear expansion of the extensible member can be determined so that the displacement amount is equal to 0.03 millimeter.

A first example of the embodiment is explained with reference to FIGS. 4 to 6, 10A, 10B, 11A, 11B, and 17.

With reference to FIGS. 10A and 10B, functions of the present invention based on basic principle are specifically explained.

The change in the attitude of a folding mirror 206 if the extensible member 209 is provided to contact with the mirror 206 either directly or indirectly, as shown in FIGS. 10A and 10B, is explained.

In FIGS. 10A and 10B, the folding mirror 206 is a generic term for the mirrors 124 to 127 shown in FIGS. 4 to 7, and means one of the first folding mirrors 124 to 127 in this example. The mirrors 124 to 127 are indicated in parentheses in FIGS. 10A and 10B. Likewise, in FIGS. 10A and 10B, the extensible member 209 is a generic term for the extensible members 157 to 160 shown in FIGS. 4 and 6, and means the one of the members 157 to 160, the members 157 to 160 are indicated in parentheses in FIGS. 10A and 10B, and the extensible member 209 shown in FIGS. 10A and 10B corresponds to the extensible member 157. The photosensitive member shown in FIGS. 10A and 10B corresponds to the photosensitive drum 2Y. The optical deflector corresponds to the optical deflector 121 as an example. This shall apply hereafter.

As the initial state of arranging and attaching the extensible members 209, two extensible members 209 having a width of 10 millimeters are arranged on both ends, i.e., a front end and an inner end of the mirror 206, respectively, as shown in FIG. 10A. One end 209-a of each extensible member 209 directly contacts with a lower reflecting surface 206a of the mirror 206 (substantially in a non-constraining manner). In addition, as shown in FIG. 10A, a lower surface of a left or the other end of each extensible member 209 is bonded and fixed to the optical housing 110 by adhesive, thereby constraining a displacement of the optical housing 110. Accordingly, as shown in FIG. 10B, only the one end 209-a of each extensible member 209 is extended from the natural length L0 in the initial state indicated by a broken line by as much as the displacement amount ΔL corresponding to a temperature rise.

When the coefficient of linear expansion of each extensible member 209 is A (1/K), the temperature change amount thereof is Δt (K), and the longitudinal length thereof is L0 (millimeter), the displacement amount ΔL of the extensible member 209 is represented by the following Equation (1).

$$\Delta L = A \times L0 \times \Delta t \quad (1)$$

When the quantity of heat applied from the optical deflector 121 is Q (joule (J)) and a thermal capacity of the extensible member 209 is C (J/K), the temperature change amount Δt is represented by the following Equation (2).

$$\Delta t = Q/C \quad (2)$$

If a specific heat and a mass of the extensible member 209 are c (J/g·K) and m (gram (g)), respectively, the thermal capacity C is represented by the following Equation (3).

$$C = m \times c \quad (3)$$

The displacement amount ΔL is represented by the following Equation (4) based on the Equations (1) to (3).

$$\Delta L = A \times Q/(m \times c) \quad (4)$$

An experiment conducted by the inventors of the present invention is shown as follows. The deviation amount of the exposure position of the laser beam in the sub-scanning direction (hereinafter, sub-scanning exposure position deviation amount) on each of the photosensitive drums 2Y, 2M, 2C, and 2Bk during continuous supply of sheets if the color laser printer 530 shown in FIG. 2 and having the optical scanner 9 shown in FIGS. 4 and 6 installed therein is used and caused to operate, saturates within about two hours to about 1 millimeter as shown in FIG. 11.

Figure 11:
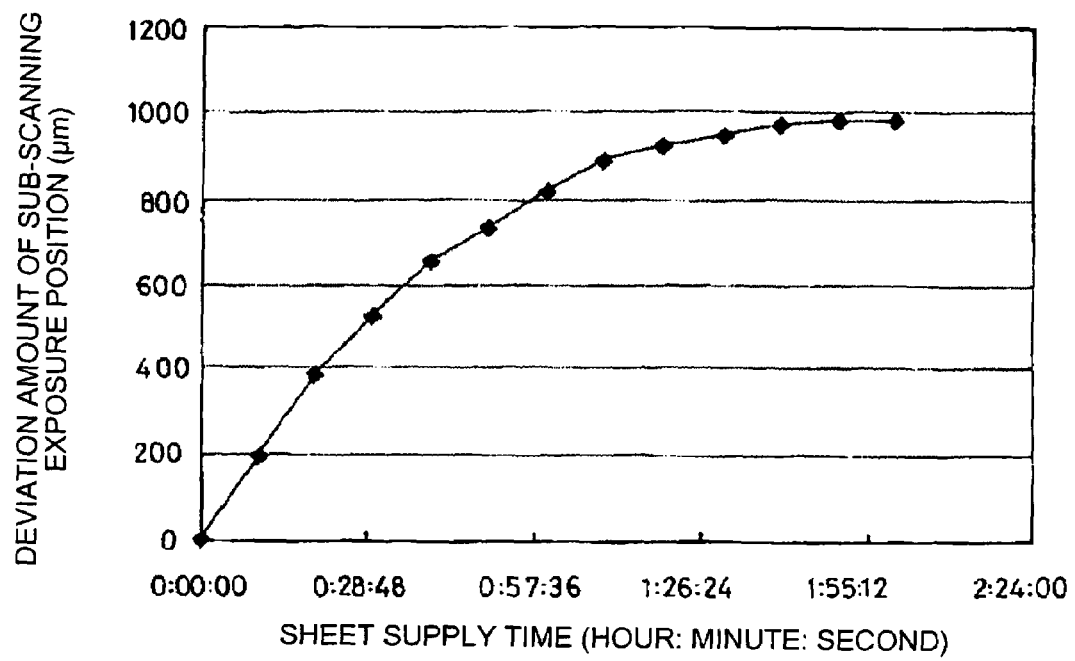
FIG. 11 depicts test results of a deviation amount of sub-scanning exposure position while a conventional color laser printer continuously supplies sheets.

FIG. 11 depicts a measuring result if the automatic positioning control is not exercised during the continuous supply of sheets. It is confirmed by the experiment that the sub-scanning exposure position deviation amount saturates within about two hours irrespective of a size of the transfer sheet and that the amount is about 1 millimeter.

If so, the angle change of the first folding mirror 124 of the optical scanner 9 configured as shown in FIG. 6 is about 10 degrees, and the positional difference between the upper reception surface 208-a and the lower reception surface 208-b of the mirror 124 is 30 micrometers. Accordingly, if the extensible member 209 having the displacement amount of 30 micrometers is used, the sub-scanning exposure position deviation can be reduced.

Figure 12:
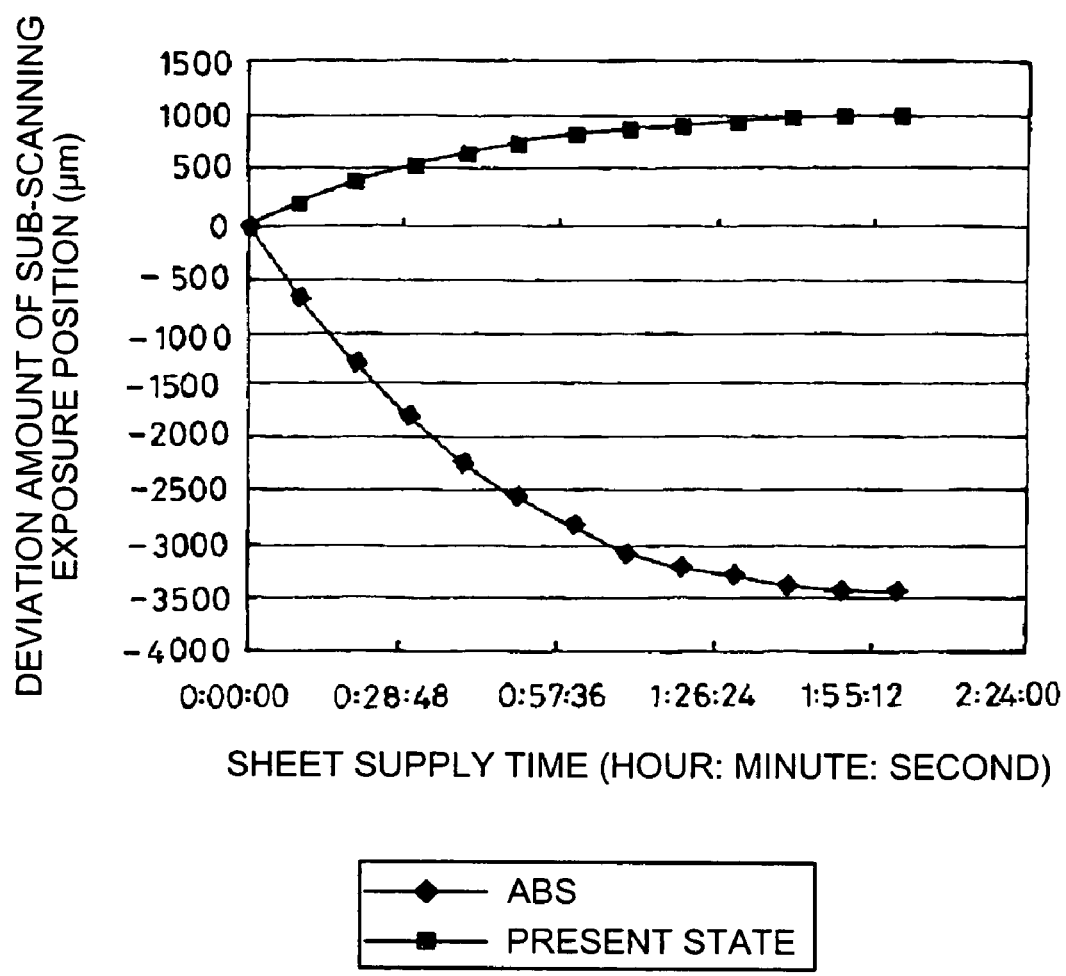
FIG. 12 depicts test results of a deviation amount of sub-scanning exposure position while a color laser printer, which employs an extendible member made of acrylonitrile-butadiene-styrene (ABS) resin, continuously supplies sheets, in comparison to the test results shown in FIG. 11.
Figure 13:
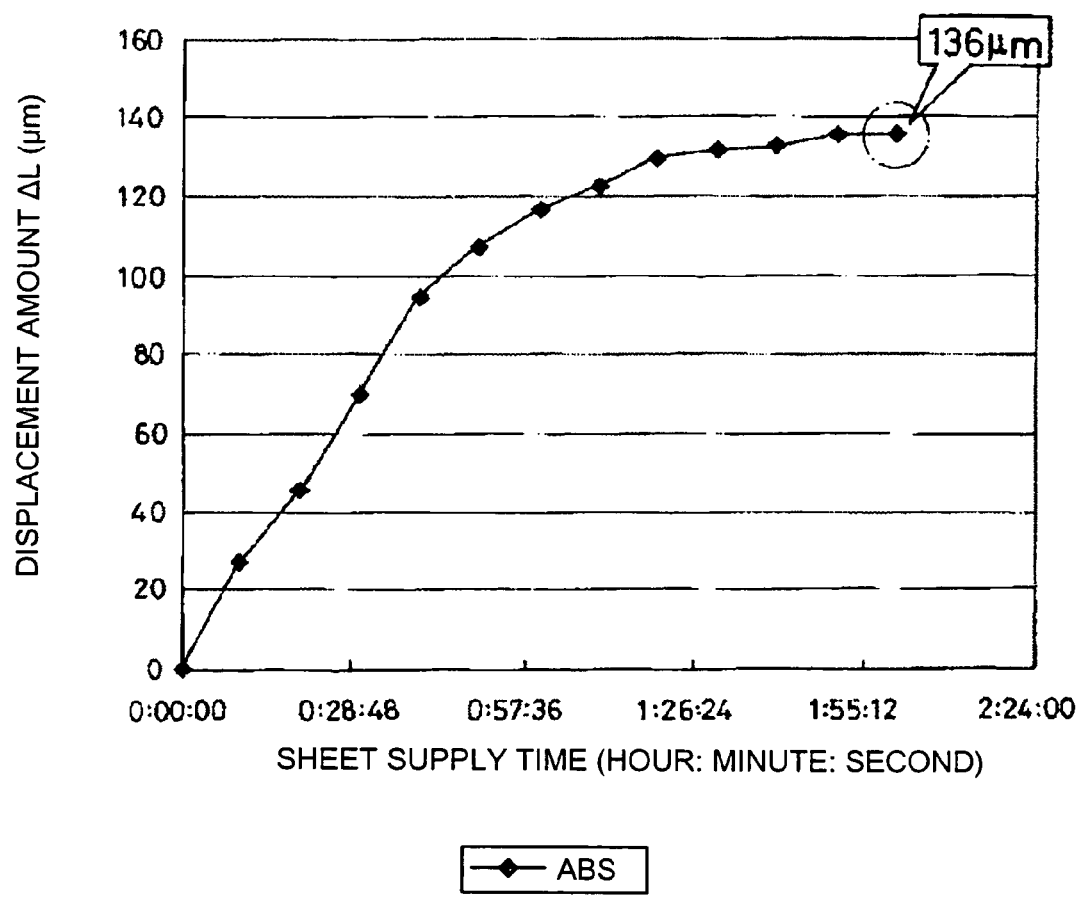
FIG. 13 depicts a displacement or change amount of the extendible member made of ABS resin while the color laser printer continuously supplies sheets.

It is easy to determine a material for the extensible member 209 having the displacement amount ΔL of 30 micrometers if the heat quantity Q applied from the optical deflector 121 is known from the Equation (4). However, in practice, it is difficult to directly calculate the heat quantity Q. Considering this, sheets are continuously supplied using the extensible members 157 to 160 made of ABS resin having the natural length L0 of 50 millimeters and the sub-scanning exposure position deviation amount, i.e., displacement amount ΔL is experimentally measured at the ordinary temperature (23° C.). Measurement results are shown in FIGS. 12 and 13. Material properties of the ABS resin used herein are shown in Table 1 below.

In FIG. 12 and the like, present state means a measurement result that is obtained using the same color laser printer as that shown in FIG. 2 in which printer the optical scanner is installed, and that differs from that is obtained using the color laser printer 530 having the optical scanner 9 according to the first example installed therein only in that the extensible members according to the first example are not used (which shall apply hereafter).

TABLE 1

| ABS Material Properties | |
| --- | --- |
| Coefficient of linear expansion α (1/K) | 0.000074 |
| Specific heat c (J/g · K) | 1.59 |
| Mass m (g) | 3.6 |
| Length L0(mm) | 50 |

As a result of the experiment, the extendible members 157 to 160 made of the ABS resin are so extremely expanded that the sub-scanning exposure positions are deviated in a negative direction as shown in FIGS. 12 and 13. It is, therefore, clear from the experiment that a material that is less extendible than the ABS resin should be used for the extendible members.

As evident from the result shown in FIG. 13, the displacement amount ΔL two hours after the continuous supply of sheets using the extendible members 157 to 160 made of the ABS resin is 136 micrometers. These values are assigned to the Equation (4) as follows.

$$0.136 = 0.000074 \times Q/(3.6 \times 1.59)$$

$$Q = 10519 (J)$$

If the intended material is equal in shape to the ABS resin, the heat quantity Q applied thereto from the optical deflector 121 is equal to that applied to the ABS resin. Therefore, the Equation (4) is modified as follows.

$$0.3 = A \times 10519/(m \times c)$$

$$A/(m \times c) = 2.9 \times 10^{-5}$$

Accordingly, if the material that satisfies $A/(m \times c) = 2.9 \times 10^{-5}$ is selected, the displacement amount ΔL of the extensible member is equal to 30 micrometers.

Based on these, a continuous sheet supply test is conducted using the resin obtained by mixing (PC+ABS resin)

with 30% of glass fiber as the material that satisfies the A/(m×c)=2.9×10$^{-5}$. Material properties of the (PC+ABS+ 30% glass fiber) are shown in Table 2 below.

TABLE 2

(PC + ABS + 30% glass) Material Properties

| | |
|---|---|
| Coefficient of linear expansion α (1/K) | 0.000025 |
| Specific heat c (J/g · K) | 1.6 |
| Mass m (g) | 5.4 |
| Length L0(mm) | 50 |

α/(m × c) = 2.9 × 10$^{-5}$

Figure 14:
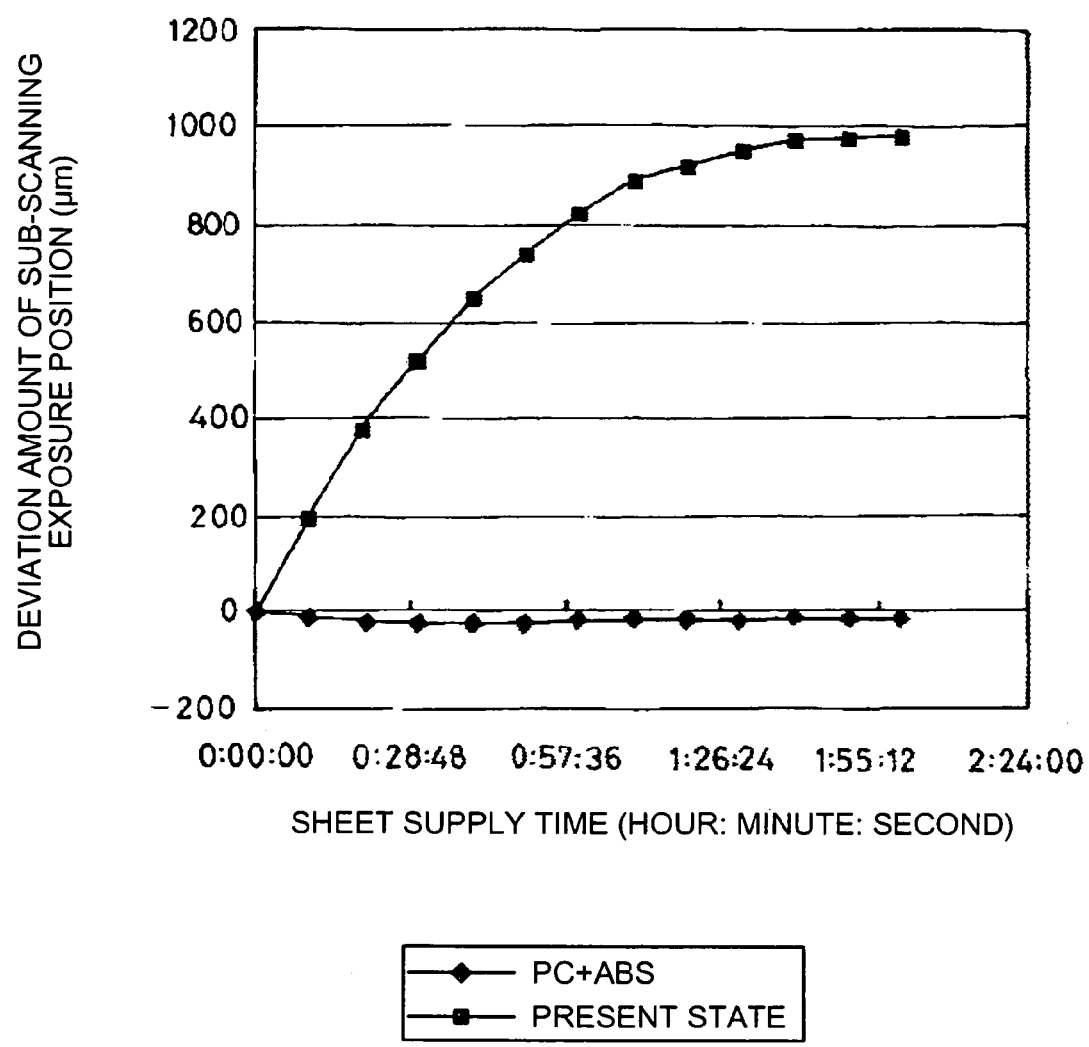
FIG. 14 depicts test results of a deviation amount of sub-scanning exposure position while a color laser printer, which employs an extensible member made of polycarbonate(PC)+ABS resin (containing 30% of glass fiber), continuously supplies sheets, in comparison to the test results shown in FIG. 11.
Figure 15:
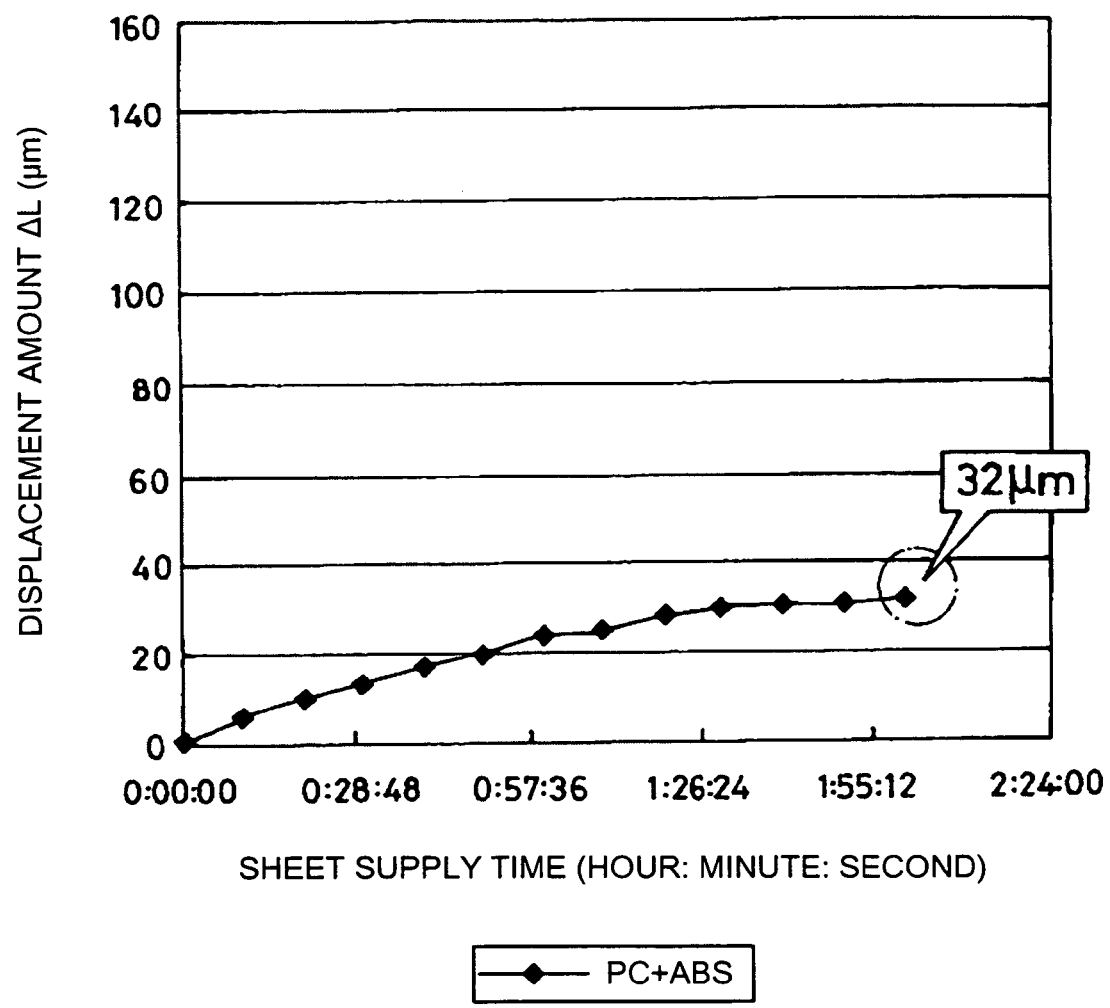
FIG. 15 depicts a displacement or change amount of the extensible member made of PC+ABS resin (containing 30% of glass fiber) when the color laser printer continuously supplies sheets as depicted in FIG. 14.

The continuous sheet supply test is conducted to measure the sub-scanning exposure position deviation amount, i.e., the displacement amount ΔL using the extensible members 157 to 160 having the properties shown in the Table 2. Test results are shown in FIGS. 14 and 15. As shown in FIG. 14, if the (PC+ABS+30% of glass fiber) resin is used as the material for the extensible members 157 to 160, the change in the attitudes of the first folding mirrors 124 to 127 can be reduced. It is, therefore, confirmed that the sub-scanning exposure deviation amount can be reduced substantially to zero.

In an actual utilization environment, the automatic color matching correction control is exercised depending on conditions such as the number of supplied sheets, a temperature within the apparatus, and the like. As partially explained, the automatic color matching control is to transfer the correction pattern shown in FIG. 3 onto the transfer belt 7a shown in FIG. 2, to read the pattern by the optical sensors 20f and 20r, to calculate the displacement amounts of the respective colors from the intended position, and to change the write timings for the respective colors. Normally, it takes about one minute to exercise this control. However, if the automatic color matching correction control is exercised, the user is unable to print out the images during this time. It is, therefore, undesirable to frequently exercise the automatic color matching correction control. According to the present invention, by contrast, by using the extendible members, it is possible to reduce the sub-scanning positional deviation even if the frequency of the automatic color matching correction control is greatly decreased.

Figure 16:
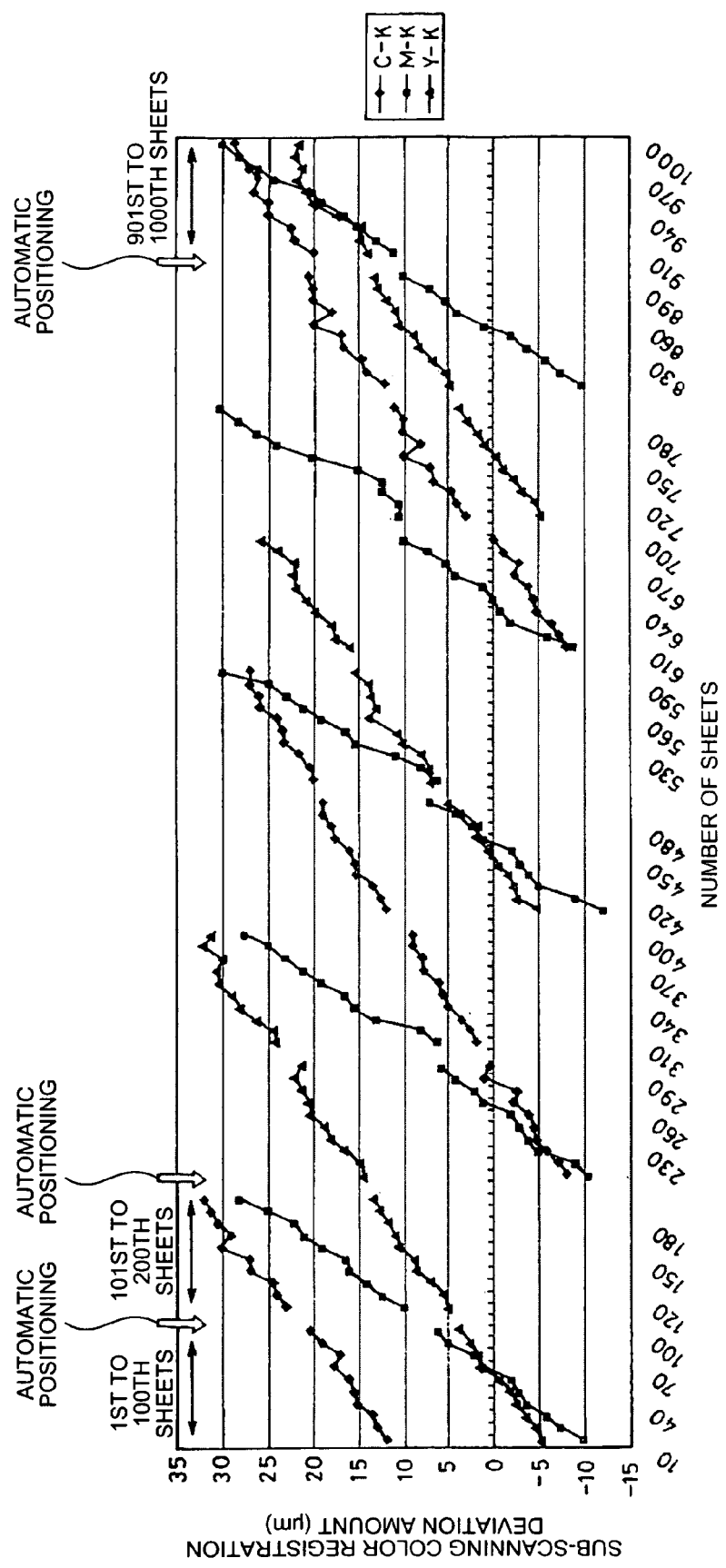
FIG. 16 depicts changes in color registration deviation amounts of respective colors when the conventional color laser printer repeatedly supplies 100 sheets and performs automatic positioning control ten times.

FIG. 16 is a comparison example of a second example (a comparison between the present state and the conventional example). In FIG. 16, the automatic color matching correction control is referred to as automatic positioning control. The automatic positioning control is equivalent to the automatic color matching correction control. This shall also apply to FIG. 17.

FIG. 16 depicts a test result of repeatedly exercising the continuous sheet supply and the automatic color matching correction control using the same color laser printer as that shown in FIG. 2 in which printer the optical scanner is installed. The test result differs from that using the color laser printer 530 having the optical scanner 9 according to the first example installed therein only in that the extensible members according to the first example are not used.

After the continuous supply of 100 sheets, an operation for exercising the automatic color matching correction control is repeatedly performed ten times. In the graph of FIG. 16, the horizontal axis indicates the number of supplied sheets and the vertical axis indicates the sub-scanning color registration deviation amount. In FIG. 16, changes in color registration deviation amounts of the three colors relative to black are shown (the same is true for FIG. 17). Each point in the graph is obtained by plotting averages of the color registration deviation amounts of the respective colors for every ten sheets. As evident from the graph, in the present state, the sub-scanning exposure positions of the respective colors are deviated due to the influence of the heat emitted from the optical deflector 121 while 100 sheets are continuously supplied. As a result, the color registration deviation is gradually increased. Furthermore, the write timings of writing the images of the respective colors are changed by the automatic color matching correction control. However, a resolution at each write timing is, for example, about 40 micrometers for a machine having a resolution of 6000 dpi. Due to this, the correction is not made for the color registration deviation of about 20 micrometers and the next image is printed in color registration deviation state. For instance, after 100 sheets of C-Bk are continuously supplied, the color registration deviation of about 20 micrometers occurs. However, supply of the next 101st sheet is started without correcting the color registration deviation. It is understood that the color registration deviation exceeding 30 micrometers occurs to a 200th sheet.

Figure 17:
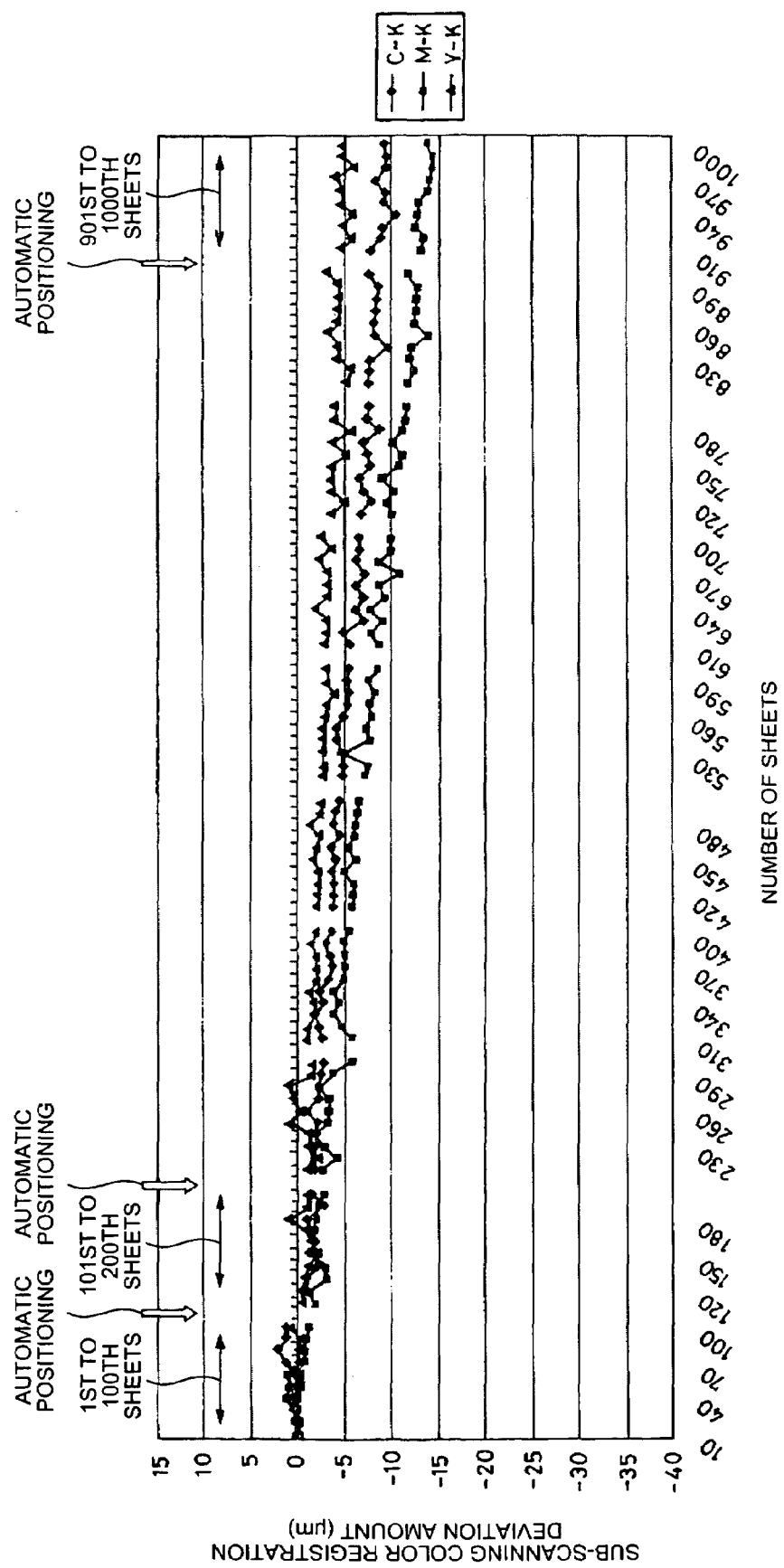
FIG. 17 depicts changes in color registration deviation amounts of respective colors when the color laser printer, which employs the extensible member made of PC+ABS resin (containing 30% of glass fiber), repeatedly supplies 100 sheets and performs automatic positioning control ten times.

FIG. 17 depicts the second example.

In the second example, a test result of repeatedly performing the continuous sheet supply and the automatic color matching correction control using the color laser printer 530 in which the optical scanner 9 is installed and in which the extensible members 157 to 160 made of the (PC+ABS+30% of glass fiber) resin shown in the first example and each having a displacement amount appropriate for the first folding mirrors 124 to 127, respectively are used. As shown in FIG. 17, by using the extensible members 157 to 160, the color registration deviation amount of each color is a maximum of about 15 micrometers after supply of 100 sheets. It is, therefore, possible to keep the color registration deviation in an acceptable level without changing each write timing by the automatic positioning control.

In FIG. 17, the fact that a change in the color registration deviation amount of each color relative to black draws a continuously decreasing line in the negative direction depends on the transfer device 7. The roller 7d that drives the transfer belt 7a of the transfer device 7 shown in FIG. 2 is thermally expanded during the continuous operation, whereby the transfer speed is gradually accelerated from the target speed. Accordingly, the color registration deviation of each color relative to black becomes a minus.

In the image forming apparatus that employs the extensible members and that includes the automatic color matching correction control function as explained in the second example, the down time can be greatly reduced and the color registration deviation can be always kept in an acceptable level.

Figure 18:
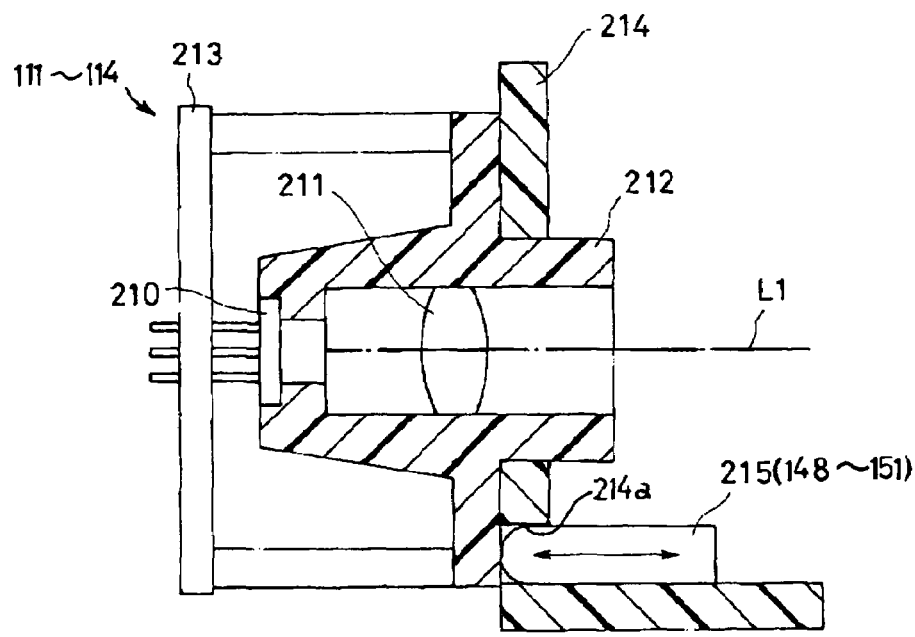
FIG. 18 is a cross-sectional view of a state in which the extensible member is in contacted with a light source unit.

With reference to FIG. 18, an example in which the extensible members 215 are attached to the light source units 111 to 114 is explained, while typically referring to the light source unit 111 and the extensible member 148 shown in FIG. 4. The extensible member 215 is a generic term for the extensible members 148 to 151 shown in FIG. 14, which are indicated in parentheses in FIG. 18.

In FIG. 18, the light source unit 111 mainly includes a semiconductor laser (LD) 210, a printed circuit board 213 for driving the LD 210, a holder member 212, a coupling lens 211, and a write housing 214 (an immovable member). The holder member 212 is attached to and supported by the printed circuit board 213 through upper and lower pedestals for attaching the LD 210. The coupling lens 211 is attached and fixed into the holder member 212. The write housing 214 into which an outer peripheral surface of the holder member 212 is fitted and which supports the holder member 212 is formed integrally with the optical housing 110. The write housing 214 is formed integrally with the optical housing 110 shown in FIG. 4 and the like.

FIG. 18 depicts an attachment state of the extensible member 215 in which a left or one end (free end) of the extensible member 215 contacts with a lower portion of a flange of the holder member 212 through a through hole 214a formed to penetrate the write housing 214, and in which a lower end of a right or the other end of the extensible member 215 is fixed to the write housing 214.

By so attaching, if the extensible member 215 is extended or contracted according to a temperature change, for example, extended leftward by the thermal expansion, the left one end of the extensible member 215 is displaced so as to translate the light source unit 111 to left in parallel. It is, therefore, possible to reduce the change in the irradiation angle of the laser beam L1 emitted from the LD 210 of the light source unit 111.

Figure 19:
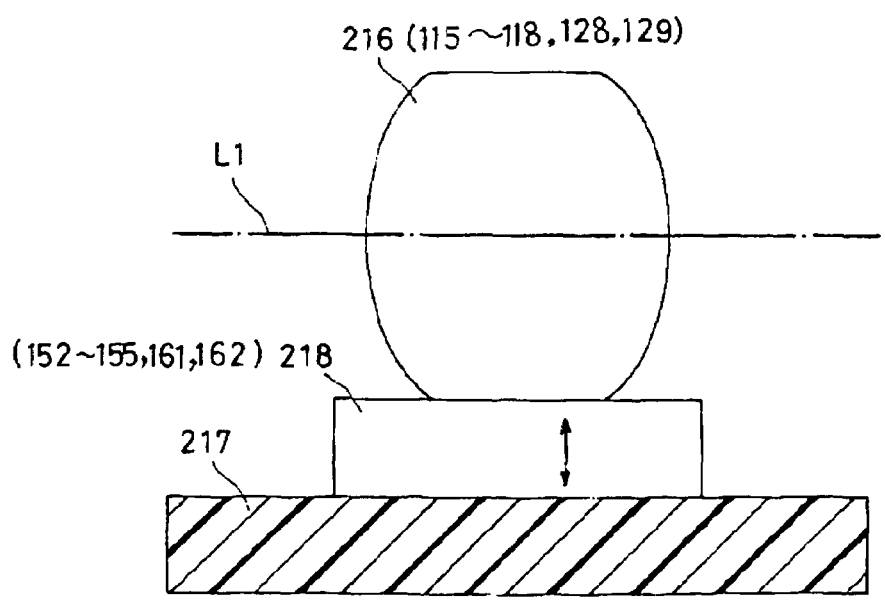
FIG. 19 is a cross-sectional view of a state in which the extensible member is in contact with a lens.

With reference to FIG. 19, an example in which the extensible member 218 is arranged relative to and attached to a lens 216 is explained next. The extensible member 218 is a generic term for the extensible members 152 to 155, 161, and 162 shown in FIG. 4, the lens 216 is a generic term for the cylindrical lenses 115 to 118 and the second imaging lenses 128 and 129 shown in FIGS. 4 and 6. The extensible members 152 to 155, 161, and 162, and the cylindrical lenses 115 to 118 and the second imaging lenses 128 and 129 are indicated in parentheses in FIG. 19.

In FIG. 19, an upper or one end (free end) of the extensible member 218 arranged within the optical scanner 9 contacts with the lens 216 which is an optical component, thereby reducing the change in the attitude of the lens 216, that is, the change in the attachment position of the lens 216. In FIG. 19, a lower or the other end (proximal end) of the extensible member 218 is fixed to a write housing (an immovable member) formed integrally with the optical housing 110 shown in FIG. 4 and the like.

If the extensible member 218 is not attached, then the lens 216 is displaced in a downward direction in FIG. 19 and a laser irradiation position is changed. By attaching the extensible member 218, the extensible member 218 is displaced by the thermal expansion in a plate thickness direction and a height of the optical beam L1 can be maintained. In this case, the heat can be transmitted to the extensible member 218 from the optical housing 110 through the write housing 217, the hot air current from the heat source (the optical deflector) (not shown) can be struck against the extensible member 218, or the extensible member 218 can be brought into direct contact with the heat source (not shown).

Figure 20:
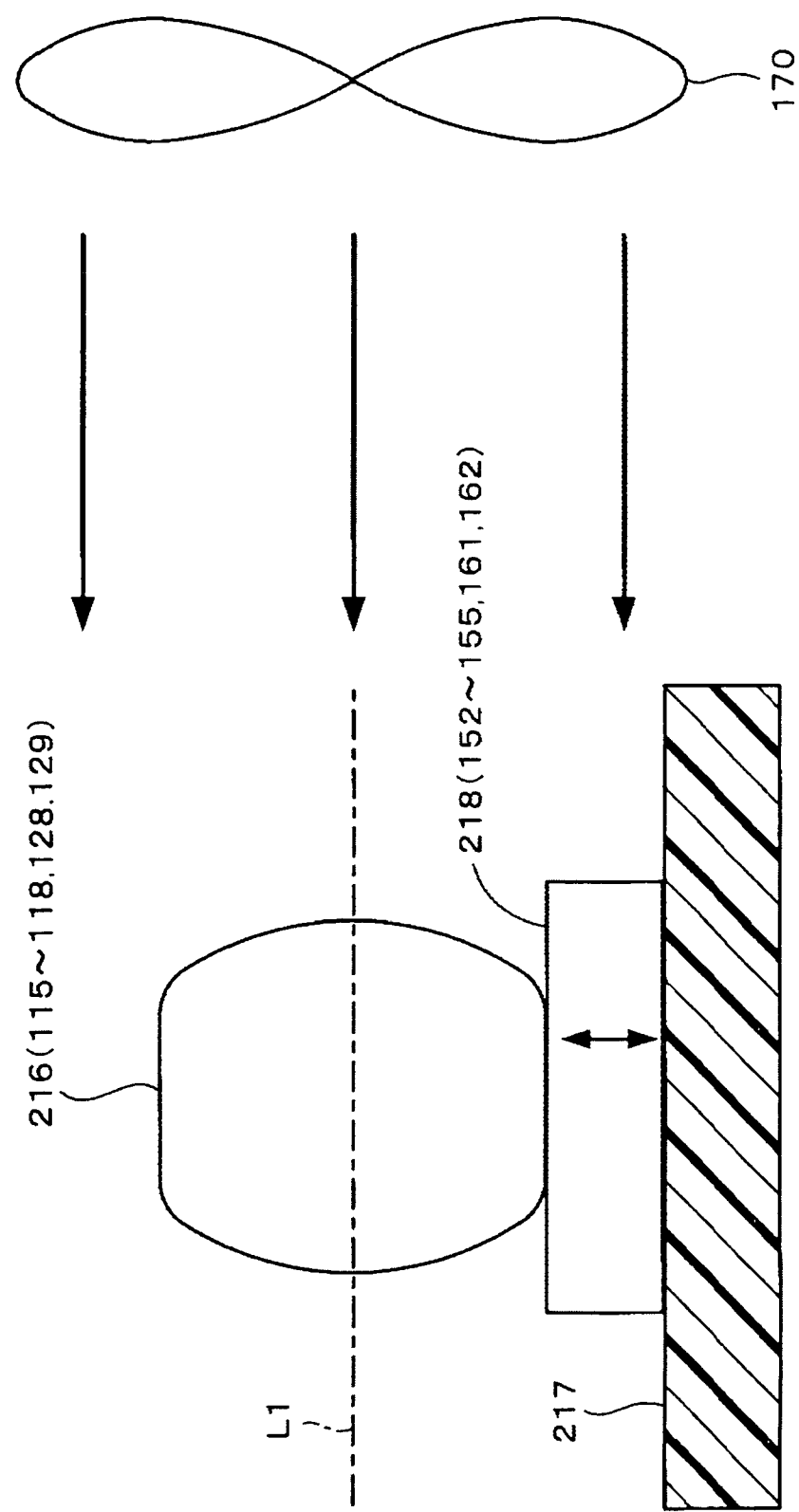
FIG. 20 is a cross-sectional view of a state in which the extensible member is in contact with the lens while cooling the member.

FIG. 20 is a modification of the example shown in FIG. 19.

The modification shown in FIG. 20 differs from the example shown in FIG. 19 only by providing a cooling fan 170 for cooling the optical components and the like including the lens 216 and the extensible members 218 within the optical scanner. By heating the extensible member 218 by the heat source (not shown) or by cooling the extensible member 218 by a function of the cooling fan 170, the lens 216 is displaced by the thermal expansion or contraction in the plate thickness direction of the extensible member 218 according to the temperature change, thereby making it possible to maintain the height of the laser beam L1.

As explained so far, the embodiment of the present invention, the first and the second examples thereof, and the other examples use the method for correcting the attitude of the optical scanner, the optical scanner includes the light source unit that emits a light beam, the deflection unit that deflects the light beam and that performs a main scanning, the optical unit that introduces the light beam from the light source unit to a scanning target surface, and the housing unit that stores at least one unit (e.g., one of the first folding mirrors 124 to 127) of the light source unit, the optical unit, and the deflection unit, wherein by using the extensible member (e.g., one of the extensible members 157 to 160) that individually contacts with at least one of the light source unit and the optical unit each of which has an attitude change while the optical scanner 9 is used and which has the most contribution to the correction in the sub-scanning direction, and that is extended or contracted according to the temperature change to thereby reduce the attitude change of the at least one unit (e.g., one of the first folding mirrors 124 to 127) of the light source unit and the optical unit, the attitude of the at least one (e.g., one of the first folding mirrors 124 to 127) of the light source unit and the optical unit is corrected, and the position of the light beam related to the sub-scanning direction on the scanning target surface of one of the image carriers, e.g., the photosensitive drums 2Y, 2M, 2C, and 2Bk is made appropriate.

Furthermore, needless to say, all the extensible members 148 to 166 shown in FIGS. 4 and 6 are arranged and attached at positions at which the extensible members 148 to 166 do not obstruct the optical paths of the light beams, as already explained.

As explained so far, the embodiment of the present invention, the first and the second examples thereof, and the other examples exhibit the following advantages and effects.

The optical scanner 9 includes the extensible members 148 to 166, 209, 215, and 218 each of which directly or indirectly contacts with one of the light source units 111 to 114 and the optical components such as the cylindrical lenses 115 to 118, the mirrors 119, 120, and 206, the first folding mirrors 124 to 127, the second imaging lenses 128 to 131, the second folding mirrors 132 to 135, the third folding mirrors 136 to 139, and the lens 216 each having an attitude change while the optical scanner 9 is used, and each of which is extended or contracted according to the temperature change to thereby reduce the attitude change of one of the light source units and the optical components. The optical scanner 9 is thereby configured so that the displacement of the corresponding one of the light source units and the optical components is cancelled by the extension displacement of each of the extensible members 148 to 166, 209, 215, and 218 due to the thermal expansion. The displacement of each of the light source units and the optical components is, therefore, suppressed with the simple and inexpensive configuration. Accordingly, the light beam (laser beam) can be irradiated on the intended position. Accordingly, it is eventually possible to eliminate the user's waiting time and prevent occurrence of the position deviation and the color registration deviation. The image quality can be thereby kept favorably.

The direction of the attitude change of each of the light source units and the optical components is the sub-scanning direction orthogonal to the main scanning direction. Therefore, each extensible member is displaced in the direction in which the attitude change of the corresponding one of the light source units and the optical components, which change causes the position of the light beam to be displaced in the sub-scanning direction orthogonal to the main scanning direction of the light beam, is cancelled by the thermal expansion of the extensible member to thereby reduce the attitude change amount. It is, therefore, possible to irradiate the light beam (laser beam) on the intended position in the sub-scanning direction.

The attitude change is a change in the reflection angle of one of the mirrors 119, 120, and 206, the first folding mirrors 124 to 127, the second folding mirrors 132 to 135, and the third folding mirrors 136 to 139. Therefore, each extensible member provided to correspond to each of the mirrors is contacted with the mirror, which is the optical component. In addition, the extensible member is displaced in the direction in which the change in the reflection angle of the mirror is cancelled by the extension displacement of the extendible member due to the thermal expansion to thereby reduce the attitude change amount of each mirror. It is, therefore, possible to irradiate the light beam (laser beam) on the intended position.

The extensible members 165 and 166 (those on the left half side of FIG. 6 are not shown) are provided to correspond to the third folding mirrors 136 to 139 arranged most downstream on the optical path. This function, therefore, makes it possible to irradiate the light beam (laser beam) on the intended position.

The extensible members 157 to 160 are provided to correspond to the first folding mirrors 124 to 127 arranged upstream of the second imaging lenses 128 to 131 serving as correction lenses on the optical path. This function, therefore, makes it possible to irradiate the light beam (laser beam) on the intended position.

The extensible members 163 and 164 (those on the left half side of FIG. 6 are not shown) are provided to correspond to the second folding mirrors 132 to 135 arranged downstream of the second imaging lenses 128 to 131 serving as correction lenses on the optical path. This function, therefore, makes it possible to irradiate the light beam (laser beam) on the intended position.

The attitude change is a change in the attachment position of a lens. Therefore, each extensible member provided to correspond to each lens is contacted with the lens, which is the optical component. In addition, the extensible member is displaced in the direction in which the change in the attachment position of the lens is cancelled by the extension displacement of the extensible member due to the thermal expansion to thereby reduce the change amount of the attachment position of the lens. It is, therefore, possible to irradiate the light beam (laser beam) on the intended position.

The extensible members 161 and 162 (those on the left half side of FIG. 6 are not shown) are provided to correspond to the second imaging lenses 128 to 131 serving as the correction lenses each of which makes a correction in the sub-scanning direction. This function, therefore, makes it possible to irradiate the light beam (laser beam) on the intended position.

The extensible members 152 to 155 are provided to correspond to the optical components included in the first optical system and capable of changing the light beam to the sub-scanning direction, i.e., the cylindrical lenses 115 to 118 serving as lenses each having power in the sub-scanning direction. This function, therefore, makes it possible to irradiate the light beam (laser beam) on the intended position.

The attitude change is a change in an output angle of the light beam emitted from each of the light source units 111 to 114. Therefore, the extensible members 148 to 151 provided to correspond to the respective light source units 111 to 114 are contacted with the respective light source units 111 to 114, which are optical components. In addition, the extensible members 148 to 151 are displaced in the direction in which the attitude changes of the respective light source units 111 to 114 are cancelled by the extension displacements of the extensible members 148 to 151 due to the thermal expansion to thereby reduce the attitude change amounts of the light source units 111 to 114. It is, therefore, possible to irradiate the light beam (laser beam) on the intended position.

The extensible members 148 to 166, 209, 215, and 218 are made of resin. It is, therefore, possible to irradiate the laser beam on the intended position with quite an inexpensive configuration. In addition, even if the shape of each extensible member should be complicated to follow complication of the apparatus, the extensible member of the complicated shape can be easily formed. Even if the extensible member should be made small in size to follow reduction in size of the apparatus or the like, a large displacement amount can be obtained even for the small sized extensible member. This is because the resin is a relatively high coefficient of linear expansion.

The material for the extendible member is not limited to the resin but metal such as aluminum, an iron plate, e.g., sheet metal, or stainless steel can be used to form the extensible member. If the extensible member is made of the metal material, rigidity of the extensible member can be improved. Therefore, the quite linear relationship can be held between the displacement amount of the extensible member and that of the light source unit, thereby making it possible to realize a movement according to a design value. Depending on the optical component, the displacement amount can be small. If so, it suffices to use metal lower in coefficient of linear expansion than the resin without need to use the expensive resin having the high coefficient of thermal expansion.

The extensible members 148 to 166, 209, 215, and 218 are applied with heat from the heat source (optical deflector 121) directly. Therefore, loss is small when the heat is transmitted to each extensible member and fewer temperature change factors are present. It is, therefore, possible to always displace each extensible member according to the design value. In addition, each of these extensible members is applied with heat from the heat source (optical deflector 121 or the fixing device 8) indirectly. Therefore, even if the optical component is away from the heat source, the attitude change of the optical component can be reduced by each extensible member.

The heat source is a motor (not shown) that drives the optical deflector 121. Since the motor is one of components that emit heat in the largest quantity within the optical scanner 9, the temperature rise in the optical scanner 9 has a close relation to the temperature rise of the motor. Accordingly, if the motor is regarded as the heat source and the extensible members that use the heat emitted from the motor are employed, it is possible to suppress the attitude change of each optical component due to the temperature rise within the optical scanner 9 by the extensible member that is displaced and extended or contracted according to the temperature change due to the heat history of the motor. This change can be thereby synchronized with the suppression. The attitude change can be, therefore, efficiently reduced.

The extensible members 156a, 156b, and 158 to 160 are applied with the heat by the air current generated by rotation of a plurality of planes of deflection of the optical deflector 121. The air current is a hot current generated by blowing the heat from the optical deflector 121, which is one of the components that emit heat in the largest quantity within the optical scanner 9, against the interior of the optical scanner 9 by rotation of the optical deflector 121 itself. Accordingly, if the hot current is regarded as the heat source and the extensible members that use the heat are employed, it is possible to suppress the attitude change of each optical component due to the temperature rise within the optical scanner 9 by the extensible member that is extended or contracted by the hot current. The change can be thereby synchronized with the suppression. The attitude change can be, therefore, efficiently reduced.

The extensible members 156a, 156b, and 158 to 160 are arranged leeward of the air current relative to the plurality of planes of deflection of the optical deflector 121. The hot current can be efficiently blown against each extensible member. Accordingly, if the hot current is regarded as the heat source and the extensible members that use the heat are employed, it is possible to suppress the attitude change of each optical component due to the temperature rise within the optical scanner 9 by the extensible member that is extended or contracted by the hot current. The change can be thereby synchronized with the suppression. The attitude change can be, therefore, efficiently reduced.

The optical housing 110 of the optical scanner 9 are made of resin. It is, therefore, possible to manufacture the optical housing 110 of the optical scanner 9 having the complicated configuration at low cost in large quantities. However, if the resin housing is used, the attitude change of each of the optical components and the light source units occurs according to the temperature as explained. This results in deterioration of accuracy of the light beam (laser beam) irradiation position. According to the present invention, since the attitude change of each of the optical components and the light source units can be suppressed, it is possible to eliminate disadvantages while maintaining advantageous respects of the resin housing.

The image forming apparatus is the color laser printer 530 or so-called direct transfer type quadruple tandem full-color image forming apparatus that forms latent images on a plurality of (four in the embodiment) photosensitive drums 2Y, 2M, 2C, and 2Bk by the optical scanner 9, respectively, that develops the latent images with toners different among the photosensitive drums 2Y, 2M, 2C, and 2Bk, that sequentially registers and transfers toner images formed on the respective photosensitive drums 2Y, 2M, 2C, and 2Bk onto a transfer sheet carried on the transfer belt 7a, and that thereby obtains a color image. Due to this, the color registration deviation occurs to the image unless the four colors are accurately registered. Since the toner images are directly transferred onto the transfer sheet, it is difficult to always keep the color registration deviation in an acceptable level irrespective of the type of the sheet or a utilization environment. However, by employing the extensible members, the color registration deviation can be always kept in an acceptable level irrespective of the type of the sheet or the utilization environment. In other words, by applying the extensible members to the direct transfer type image forming apparatus that transfers the toners of four colors from the photosensitive drums onto a print sheet, it is possible reduce the exposure position deviation and print out images free from color registration deviation without deteriorating productivity.

The heat source is the fixing device 8 that fixes the toner images to the transfer sheet onto which the toner images are transferred. Depending on the configuration of the image forming apparatus, the attitudes of the respective optical component and light source units within the optical scanner are often changed by the heat from the fixing device 8. Even so, by optimizing the shape and the material of each extensible member based on the relationship between the attitude change amount and the exposure position deviation amount, the influence of the heat from the fixing device 8 can be eliminated and the sub-scanning position deviation can be always kept in an acceptable level.

Figure 21:
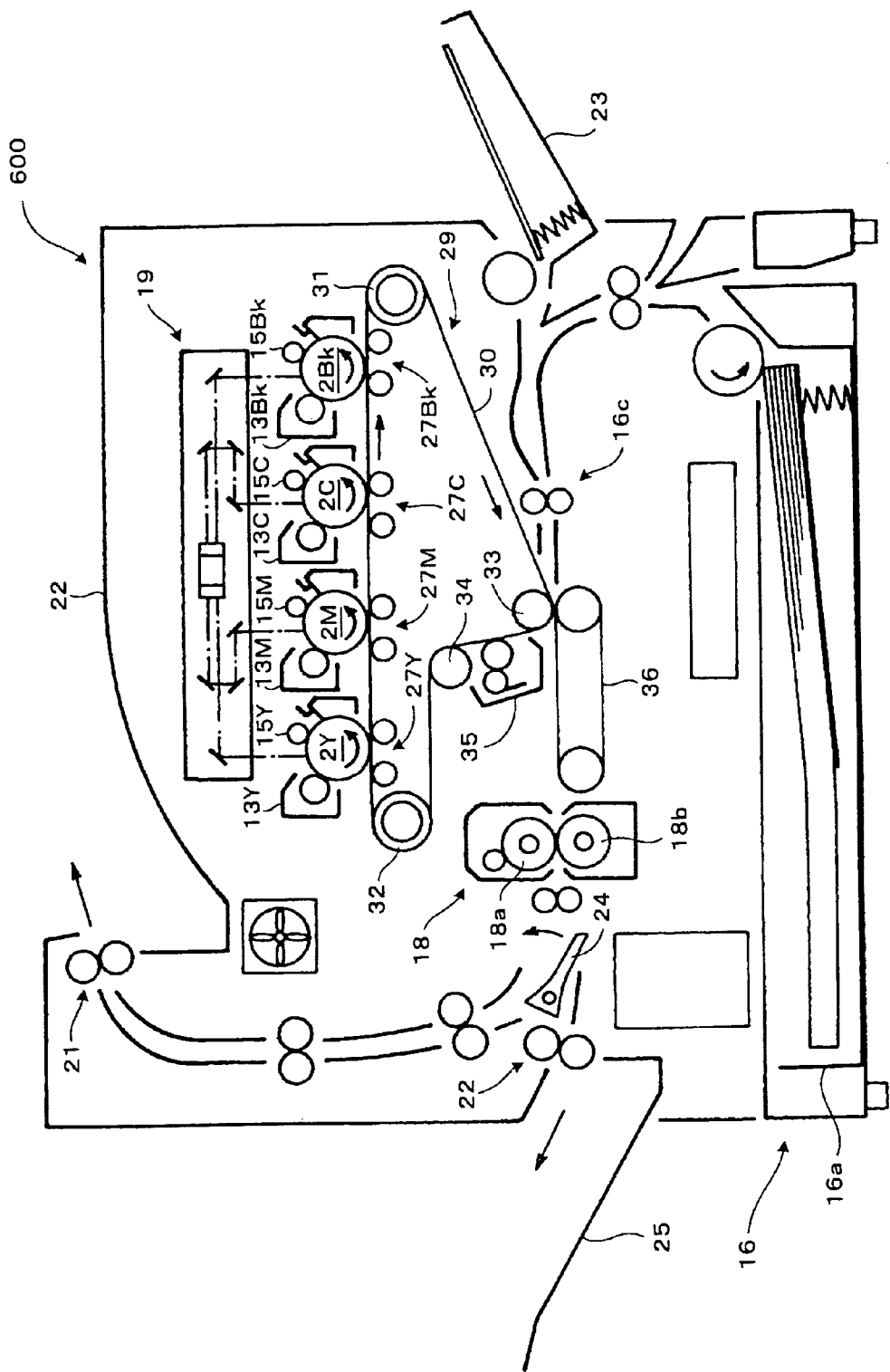
FIG. 21 is a schematic front view of a color laser printer as one example of an intermediate transfer type quadruple tandem full-color image forming apparatus to which the present invention is applied.

With reference to FIG. 21, another example of the present invention is explained.

The extensible members according to the present invention can be applied not only to the color laser printer 530, which is the direct transfer type quadruple tandem full-color image forming apparatus shown in FIG. 2 and to the optical scanner 9 of the color laser printer 530 but also to a color laser printer 600 which is an intermediate transfer type quadruple tandem full-color image forming apparatus shown in FIG. 21.

The color laser printer 600 shown in FIG. 21 differs from the color laser printer 530 shown in FIG. 12 by including an optical scanner 19 in place of the optical scanner 9 and a transfer device 29 in place of the transfer device 7. In the color laser printer 600, constituent components and members having functions substantially equal to those of the color laser printer 530 are denoted by the reference symbols of the constituent components and members of the color laser printer 530 plus a value 10, respectively. Therefore, they will not be explained herein.

The transfer device 29 includes an intermediate transfer belt 30 serving as an intermediate transfer body, and a plurality of rollers 27Y, 27M, 27C, 27Bk, 31, 32, 33, and 34 on which the intermediate transfer belt 30 is spread. The intermediate transfer belt 30 is rotationally moved in an arrow direction shown in FIG. 21 while contacting with outer circumferential surfaces of respective photosensitive drums 2Y, 2M, 2C, and 2Bk. Toner images of yellow, magenta, cyan, and black are sequentially transferred onto the intermediate transfer belt 30 at tuned timings, and registered thereon, thereby forming color images. The roller 31 is a driving roller, the roller 32 is a driven roller, and the rollers 27Y, 27M, 27C, and 27Bk are primary transfer rollers serving as primary transfer means. The roller 33 is a secondary roller serving as secondary transfer means. In FIG. 21, reference numeral 23 denotes a manual feed tray and reference numeral 25 denotes a paper discharge tray of a lower tier.

Transfer sheets starting at an uppermost sheet are fed from the paper feed tray 16a by a paper feed roller one by one and fed to a transfer region at a timing tuned to that of starting of recording in the sub-scanning direction (paper feed direction) by a pair of registration rollers 16c.

The color images registered on the intermediate transfer belt 30 are collectively transferred onto each transfer sheet in the transfer region by the secondary transfer roller 33. The transfer sheet onto which the color images are transferred is fed to a fixing device 18 serving as fixing means that includes a heating roller 18a and a pressure roller 18b also referred to as fixing rollers. The color images are fixed onto the transfer sheet by the fixing device 18. In a state in which a paper discharge branch claw 24 is located as shown in FIG. 21, the transfer sheets onto which the color images are fixed are discharged in a face-down state to a paper discharge tray 22 formed on an upper surface of the color laser printer 600, which is the image forming apparatus, and stacked thereon. Residual toners and the like on the intermediate transfer belt 30 are cleaned by a belt cleaning device 35 after the transfer. The transfer sheets onto which the color images are fixed are guided, transported, and discharged to and stacked on the lower paper discharge tray 25 by vibration of the paper discharge branch claw 24 in an upward direction as indicated by an arrow.

In the color laser printer 600 that includes the optical scanner 19, similarly to the color laser printer 530 shown in FIG. 2, extensible members extended or contracted by the temperature change to reduce the changes in the attitudes of the optical components such as the light source units, the folding mirrors, and the lenses (not shown) the attitudes of which are changed while the optical scanner 19 is in use are arranged so as to contact therewith either directly or indirectly independently of one another. The color laser printer 600 can thereby exhibit the effects and advantages explained above as will be readily understood by a person having ordinary skill in the art.

Namely, according to this example, the image forming apparatus is the color laser printer 600 or so-called intermediate transfer type quadruple tandem full-color image forming apparatus that forms latent images on a plurality of (four in this example) photosensitive drums 2Y, 2M, 2C, and 2Bk by the optical scanner 19, respectively, that develops the latent images with toners different among the photosensitive drums 2Y, 2M, 2C, and 2Bk, that sequentially registers and transfers toner images formed on the photosensitive drums 2Y, 2M, 2C, and 2Bk onto the intermediate transfer belt 30, that them collectively transfers the toner images onto the transfer sheet, and that thereby obtains a color image. After the toners of four colors are transferred onto the intermediate transfer belt 30 and registered thereon, the toner images are transferred onto the transfer sheet. The intermediate transfer type quadruple tandem full-color image forming apparatus is, therefore, advantages over the direct transfer type quadruple tandem full-color image forming apparatus in prevention of the color registration deviation and in high speed printing. Accordingly, if the extensible members are employed in the intermediate transfer type quadruple tandem full-color image forming apparatus, it is possible to obtain a higher quality image. In other words, by applying the extensible members to the intermediate transfer type image forming apparatus that transfers the toners of four colors onto the intermediate transfer belt 30, that registers the toners of four colors, and that then transfers the toner images onto the print sheet, it is possible to reduce the exposure position deviation and favorably print out images free from color registration deviation without deteriorating productivity.

The heat source is the fixing device 18 that fixes the toner images to the transfer sheet onto which the toner images are transferred. Depending on the configuration of the image forming apparatus, the attitudes of the respective optical component and light source units within the optical scanner are often changed by the heat from the fixing device 18. Even so, by optimizing the shape and the material of each extensible member based on the relationship between the attitude change amount and the exposure position deviation amount, then the influence of the heat from the fixing device 18 can be eliminated and the sub-scanning position deviation can be kept in an acceptable level.

The color laser printer 600 can be configured to include plurality of optical scanners to which the respective extensible member is applied.

In the embodiments and the first and the second examples, the color laser printer 530 or 600 has been shown as the image forming apparatus to which the optical scanner 9 or 19 can be applied. However, the image forming apparatus to which the optical scanner 9 or 19 can be applied is not limited to the color laser printer 530 or 600, and other image forming apparatuses, such as a monochrome or color copying machine, a monochrome printer, a facsimile machine, a plotter, or a multifunction product that includes two or more functions thereof, are also applicable.

According to the present invention, it is possible to reduce the attitude change of at least one of a light source unit and an optical unit within a housing unit of an optical scanner resulting from the heat emitted from, for example, a driving unit for a deflection unit without using expensive detection means, actuator that controls a mechanism or the like, but by using a considerably low cost means. It is also possible to eliminate the user's waiting time and prevent occurrence of the position deviation and the color registration deviation. The image quality can be thereby kept favorably.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanner comprising:
   at least one light source that emits a light beam;
   a deflection unit that receives the light beam from the light source and deflects the light beam in a main scanning direction;
   an optical unit that receives the light beam from the deflection unit and introduces the light beam to a target surface;
   a housing unit that stores at least one of the light source, the deflection unit, and the optical unit; and
   a member that directly or indirectly contacts at least one of the light source and the optical unit, wherein
      at least one of the light source and the optical unit changes in attitude due to a temperature change while the optical scanner is operating, and
      the member extends or contracts according to the temperature change so as to reduce the change of the attitude.

2. The optical scanner according to claim 1, wherein the attitude changes in a sub-scanning direction orthogonal to the main scanning direction.

3. The optical scanner according to claim 1, wherein the optical unit includes a mirror, and
the change of the attitude is a change in a reflection angle of the mirror.

4. The optical scanner according to claim 3, wherein the optical unit includes an optical path, and
the mirror is arranged most downstream on the optical path.

5. The optical scanner according to claim 3, wherein the optical unit includes a correction lens that corrects the light beam in a sub-scanning direction orthogonal to the main scanning direction, and
the mirror is arranged upstream of the correction lens.

6. The optical scanner according to claim 3, wherein the optical unit includes a correction lens that corrects the light beam in a sub-scanning direction orthogonal to the main scanning direction, and
the mirror is arranged downstream of the correction lens.

7. The optical scanner according to claim 1, wherein the optical unit includes a lens, and
the change of the attitude is a change in an attachment position of the lens.

8. The optical scanner according to claim 7, wherein the lens is a correction lens that corrects the light beam in a sub-scanning direction orthogonal to the main scanning direction.

9. The optical scanner according to claim 8, wherein the optical unit is provided between the light source and the deflection unit.

10. The optical scanner according to claim 8, wherein the optical unit is provided between the deflection unit and the target surface.

11. The optical scanner according to claim 1, wherein the change of the attitude is a change in an output angle of the light beam emitted by the light source.

12. The optical scanner according to claim 1, wherein the member is made of a resin.

13. The optical scanner according to claim 1, wherein the member is made of a metal.

14. The optical scanner according to claim 1, further comprising a heat source, wherein
the member receives heat from the heat source directly or indirectly.

15. The optical scanner according to claim 14, wherein the heat source is a driving unit that drives the deflection unit.

16. The optical scanner according to claim 15, wherein the deflection unit includes a plurality of rotatable planes, and
the member receives heat by an air current generated by rotation of the planes.

17. The optical scanner according to claim 16, wherein the member is arranged leeward of the air current relative to the planes.

18. The optical scanner according to claim 1, wherein the housing unit is made of a resin.

19. The optical scanner according to claim 1, including a single light source.

20. The optical scanner according to claim 1, including a plurality of the light sources.

21. An image forming apparatus comprising:
an image carrier;
an optical scanner that forms a latent image on the image carrier;
a developing unit that develops the latent image with a toner, thereby forming a toner image on the image carrier; and
a transfer member that transfers the toner image from the image carrier onto a recording medium, wherein
the optical scanner includes
a single light source that emits a light beam,
a deflection unit that receives the light beam from the light source and deflects the light beam in a main scanning direction,
an optical unit that receives the light beam from the deflection unit and introduces the light beam to a target surface of the image carrier,
a housing unit that stores at least one of the light source, the deflection unit, and the optical unit, and
a member that directly or indirectly contacts at least one of the light source and the optical unit, wherein
at least one of the light source and the optical unit changes in attitude due to a temperature change while the optical scanner is operating, and
the member extends or contracts according to the temperature change so as to reduce the change of the attitude.

22. The image forming apparatus according to claim 21, including a plurality of the image carriers, wherein
the optical scanner forms a latent image on each of the image carriers,
the developing unit develops the latent image on each of the image carriers with a toner of a different color for each of the image carriers, thereby forming a toner image on each of the image carriers, and
the transfer member sequentially transfers each of the toner images from each of the image carriers onto a recording medium.

23. The image forming apparatus according to claim 22, wherein
the optical scanner includes a plurality of the light sources.

24. The image forming apparatus according to claim 23, further comprising an intermediate transfer member, wherein
the transfer member sequentially transfers each of the toner images from each of the image carriers to be superposed onto the intermediate transfer member, and then transfers the superposed toner images to a recording medium at once.

25. The image forming apparatus according to claim 22, further comprising an intermediate transfer member, wherein
the transfer member sequentially transfers each of the toner images from each of the image carriers to be superposed onto the intermediate transfer member, and then transfers the superposed toner images to a recording medium at once.

26. The image forming apparatus according to claim 22, wherein
the image forming apparatus can control an automatic color matching correction.

27. An image forming apparatus comprising:
an image carrier;
an optical scanner that forms a latent image on the image carrier;
a developing unit that develops the latent image with a toner, thereby forming a toner image on the image carrier; and
a transfer member that transfers the toner image from the image carrier onto a recording medium, wherein the optical scanner includes
a single light source that emits a light beam,
a deflection unit that receives the light beam from the light source and deflects the light beam in a main scanning direction,
an optical unit that receives the light beam from the deflection unit and introduces the light beam to a target surface of the image carrier,
a housing unit that stores at least one of the light source, the deflection unit, and the optical unit,
a member that directly or indirectly contacts at least one of the light source and the optical unit, and
a heat source that fixes the toner image onto the recording medium, wherein
at least one of the light source and the optical unit changes in attitude due to a temperature change while the optical scanner is operating, and
the member extends or contracts according to the temperature change so as to reduce the change of the attitude, and
the member receives heat from the heat source directly or indirectly.

28. A method of correcting an attitude of an optical scanner, the optical scanner including
a single light source that emits a light beam,
a deflection unit that receives the light beam from the light source and deflects the light beam in a main scanning direction,
an optical unit that receives the light beam from the deflection unit and introduces the light beam to a target surface of an image carrier, a housing unit that stores at least one of the light source, the deflection unit, and the optical unit, and a member that directly or indirectly contacts at least one of the light source and the optical unit, wherein at least one of the light source and the optical unit changes in attitude due to a temperature change while the optical scanner is operating, and the member extends or contracts according to the temperature change so as to reduce the change of the attitude, the method comprising:

correcting the change in the attitude of at least one of the light source and the optical unit, and adjusting a position of the light beam on the target surface in the main scanning direction and in a sub-scanning direction orthogonal to the main scanning direction.

29. The method according to claim 28, wherein a first end of the member is in contact with the at least one of the light source and the optical unit, and a second end of the member is fixed to an immovable member of the optical scanner.

30. The method according to claim 28, wherein at least one of the light source and the optical unit is urged by an urging unit in a direction in which the attitude of the at least one of the light source and the optical unit returns to a state before the attitude is changed.

* * * * *